United States Patent
Baxter et al.

(10) Patent No.: US 11,399,502 B2
(45) Date of Patent: Aug. 2, 2022

(54) SYSTEM FOR MONITORING AND CONTROLLING AN AUTOMATED LITTER DEVICE

(71) Applicant: Automated Pet Care Products, LLC, Auburn Hills, MI (US)

(72) Inventors: Brad Baxter, Bloomfield Hills, MI (US); Jacob Zuppke, Royal Oak, MI (US)

(73) Assignee: AUTOMATED PET CARE PRODUCTS, LLC, Auburn Hills, MI (US)

( * ) Notice: Subject to any disclaimer, the term of this patent is extended or adjusted under 35 U.S.C. 154(b) by 663 days.

(21) Appl. No.: 16/428,433

(22) Filed: May 31, 2019

(65) Prior Publication Data

US 2019/0364840 A1 Dec. 5, 2019

Related U.S. Application Data

(60) Provisional application No. 62/837,965, filed on Apr. 24, 2019, provisional application No. 62/678,727, filed on May 31, 2018.

(51) Int. Cl.
*A01K 1/01* (2006.01)

(52) U.S. Cl.
CPC ............ *A01K 1/0114* (2013.01); *A01K 1/011* (2013.01)

(58) Field of Classification Search
CPC .............................. A01K 1/0114; A01K 1/011
USPC .................................. 119/166, 163, 161, 165
See application file for complete search history.

(56) References Cited

U.S. PATENT DOCUMENTS

| | | | |
|---|---|---|---|
| 4,096,827 A | | 6/1978 | Cotter |
| 4,120,264 A | * | 10/1978 | Carter .................. A01K 1/0114 119/166 |
| 4,846,104 A | * | 7/1989 | Pierson, Jr. .......... A01K 1/0114 209/235 |
| 4,886,014 A | | 12/1989 | Sheriff |

(Continued)

FOREIGN PATENT DOCUMENTS

EP 2676543 B1 12/2018

*Primary Examiner* — Yvonne R Abbott-Lewis
(74) *Attorney, Agent, or Firm* — The Dobrusin Law Firm, P.C.; Daniela M. Thompson-Walters

(57) ABSTRACT

An automated litter device having: a) a chamber configured to hold litter to allow an animal to enter and excrete waste; b) a waste drawer in communication with the chamber and configured to receive the waste; c) one or more sensors configured to detect one or more conditions of the device and transmit one or more signals related to the one or more conditions; d) a controller in communication with the one or more sensors which is adapted to receive the one or more signals, wherein the controller is configured to determine one or more positions of the chamber based on the one or more signals received from the one or more sensors and interpret the one or more signals as one or more status signals; e) a communication module in communication with the controller and adapted to communicate with a user interface via a network to transmit the one or more status signals to the user interface, receive one or more instruction signals via the user interface, or both; wherein the user interface is adapted to transmit the one or more instruction signals to the controller to change at least one of the one or more conditions of the device.

20 Claims, 8 Drawing Sheets

(56) References Cited

U.S. PATENT DOCUMENTS

| | | | |
|---|---|---|---|
| 5,048,464 A * | 9/1991 | Shirley | A01K 1/0114 209/362 |
| 5,107,797 A * | 4/1992 | LaRoche | A01K 1/0114 209/296 |
| 5,477,812 A | 12/1995 | Walters | |
| 5,509,379 A * | 4/1996 | Hoeschen | A01K 1/0114 209/288 |
| 5,551,375 A * | 9/1996 | Flores | A01K 1/0114 119/166 |
| 5,622,140 A * | 4/1997 | McIlnay-Moe | A01K 1/0114 119/166 |
| 5,662,066 A * | 9/1997 | Reitz | A01K 1/0114 119/163 |
| 5,752,465 A | 5/1998 | Page | |
| 6,055,935 A | 5/2000 | Engel | |
| 6,082,302 A | 7/2000 | Thaler et al. | |
| 6,126,015 A * | 10/2000 | Haymaker | B07B 1/28 209/362 |
| 6,286,457 B1 * | 9/2001 | Sugahara | A01K 1/0114 119/161 |
| 6,463,881 B1 * | 10/2002 | Reitz | A01K 1/0114 119/170 |
| 6,851,386 B2 | 2/2005 | Northrop et al. | |
| 7,137,355 B1 | 11/2006 | Wan | |
| 7,198,006 B2 | 4/2007 | Fischer | |
| 7,278,372 B2 * | 10/2007 | Colsky | A01K 1/0114 119/166 |
| 7,487,742 B2 * | 2/2009 | Waters | A01K 1/0114 119/161 |
| 7,647,889 B2 | 1/2010 | Horanoff | |
| 7,762,231 B2 | 7/2010 | Dugas et al. | |
| 7,798,101 B2 | 9/2010 | Waters | |
| 8,413,608 B2 | 4/2013 | Sharp et al. | |
| 8,475,367 B1 | 7/2013 | Yuen et al. | |
| 8,544,418 B2 | 10/2013 | Jiang et al. | |
| 8,757,094 B2 | 6/2014 | Baxter et al. | |
| 9,433,185 B2 | 9/2016 | Baxter et al. | |
| 10,098,315 B2 * | 10/2018 | Couto | A01K 1/0114 |
| 10,321,659 B1 * | 6/2019 | Turner | A01K 1/011 |
| 2002/0139312 A1 | 10/2002 | Reitz | |
| 2007/0227457 A1 * | 10/2007 | Waters | A01K 1/0114 119/166 |
| 2008/0017123 A1 * | 1/2008 | Chin | A01K 1/011 119/166 |
| 2021/0007320 A1 * | 1/2021 | Wu | A61B 5/48 |

\* cited by examiner

SYSTEM FOR MONITORING AND CONTROLLING AN AUTOMATED LITTER DEVICE

FIELD

The present teachings generally relate to an automated system for a litter device. The present teachings may be particularly useful in remotely monitoring and receiving signals from an automated litter device, and even remotely controlling one or more operations of an automated litter device.

BACKGROUND

Automated litter devices may provide a means for pet owners (e.g., user) to effectively manage waste eliminated by one or more of their pets. These automated litter devices may be advantageous in automatically removing waste contents from litter; automatically collecting waste for subsequent disposal; storing waste contents separate from a litter chamber such that they are not exposed to the ambient environment, thereby preventing and/or reducing smell from the waste. Examples of some automated litter boxes which may be particularly beneficial may be found in U.S. Pat. Nos. 6,463,881; 8,757,094; and 9,433,185 and U.S. Provisional Application No. 62/837,965 which are incorporated by reference herein in their entirety for all purposes.

Generally, automated litter devices are standalone devices. They have one or more controllers onboard which determine one or more operations, conditions, faults, or any combination thereof directly on the device. For a user to determine a status of these operations, conditions, or faults, the user typically has to be within proximity of the litter device, or may even have to read a control panel located directly on the litter device. Thus, if one or more faults occur while a user is physically away from the automated litter device, the user may be unaware of the fault until once again in proximity. As a user is relying on the automated litter device to automatically dispose of waste contents, a user may not physically check the automated litter device more than one time per day, week, or however long until a waste drawer or other waste repository may typically take to fill. The user may even rely on the automated litter device to dispose of waste contents for extended periods of time, such as when the user is away on personal or work-related travel. As a user may be unaware one or more faults may have occurred in the litter device, the automated litter device may not properly dispose of contents for an extended period of time. Thus, problems the automated litter device is seeking to avoid are recreated, such as buildup of waste within an exposed litter chamber, smell from the waste transferring to ambient surroundings, or even hindering an animal from using the device.

As an automated litter device is generally a standalone device, a user typically needs to interface with a control panel located directly on the device to execute any operations of the device. A user may want to temporarily pause operations of the device to avoid noise, allow for comfortable training of an animal to use the device, or both. A user may want to change one or more settings of a device for comfort of the animal, such as lighting within the device, a predetermined mass which recognizes a presence of an animal, or both. A user may even want to limit functionality of a control panel, so as to avoid other individuals, such as children, or animals from accidentally touching a control panel and changing one or more settings, initiating one or more cleaning cycles, turning the device off, or any combination thereof.

Many litter box designs require manual cleaning by a user, which typically correlates to availability of time a user as opposed to waste elimination habits of the animal. Automatic litter devices may be programmed to perform a clean cycle when a waste level reaches a certain volume within a chamber for the animal, after use of the device by the animal, or both. Waste patterns of an animal may be indicative of one or more health concerns or ailments. An animal may eliminate waste more or less frequently than average, indicating the health of the animal may be deteriorating or even improving. Notwithstanding the above, there is still a need for an automatic litter device which is able to gather animal waste elimination behavior to determine the average waste eliminate habits of the animal and identify the potential presence of a health concern or improvement.

It would be attractive to monitor one or more conditions, operations, or both of a litter device from one or more computing devices remote from the litter device. It would be attractive to automatically receive one or more notifications of one or more conditions, faults, operations, or any combination thereof of an automated litter device via one or more computing devices remote from the litter device. It would be attractive to control one or more operations of an automated litter device for comfort of a user, animal, or both. It would be attractive to have a litter device which is able to be integrated into a network to allow for communication over the network. It would be attractive to use one or more operations of a litter device to determine the waste elimination behavior of an animal, and even identify the presence or absence of an ailment.

SUMMARY

The present disclosure relates to an automated litter device comprising: a) a chamber configured to hold litter to allow an animal to enter and excrete waste; b) a waste drawer in communication with the chamber and configured to receive the waste; c) one or more sensors configured to detect one or more conditions of the device and transmit one or more signals related to the one or more conditions; d) a controller in communication with the one or more sensors which is adapted to receive the one or more signals, wherein the controller is configured to determine one or more positions of the chamber based on the one or more signals received from the one or more sensors and interpret the one or more signals as one or more status signals; e) a communication module in communication with the controller and adapted to communicate with a user interface via a network to transmit the one or more status signals to the user interface, receive one or more instruction signals via the user interface, or both; and wherein the user interface is adapted to transmit the one or more instruction signals to the controller to change at least one of the one or more conditions of the device.

The present disclosure relates to a method of operating an automated litter device via a remote user interface comprising the steps of: a) receiving an input from a user via a user interface, wherein the user interface is located remotely from the device and wherein the input includes one or more instructions which instruct the device to perform one or more operations; b) sending the one or more instructions to a communication module, wherein the communication module is in communication with the user interface and a controller, and wherein both the communication module and the controller are part of the device; c) sending one or more instruction signals associated with the one or more instructions from the communication module to the controller; d) automatically initiating one or more operations of the device by the controller based on the one or more instruction signals; and wherein the device includes a chamber configured to hold litter to allow an animal to enter and excrete waste, and a waste drawer in communication with the chamber and configured to receive the waste.

The present disclosure further relates to a method of monitoring and receiving signals from an automated litter device via a communication module comprising the steps of: a) detecting one or more conditions of the device and transmitting one or more signals related to the one or more conditions; b) automatically determining one or more conditions and/or positions of the device based on the one or more signals to form one or more status signals; c) transmitting the one or more status signals to the communication module of the device; d) wirelessly transmitting the one or more status signals from the communication module via a network to a user interface, wherein the user interface is located remotely from the device; and wherein the device includes a chamber configured to hold litter to allow an animal to enter and excrete waste, and a waste drawer in communication with the chamber and configured to receive the waste.

One or more litter devices may include one or more controllers and communication modules, thus allowing one or more signals related to one or more conditions, operations, and/or faults to be communicated to one or more remotely located computing devices. One or more litter devices may be integrated into a network to transmit one or more notifications of conditions, operations, and/or faults to another computing device on the network. The one or more litter devices may be able to receive one or more instructions from one or more remotely located computing devices, thus allowing for one or more users to control one or more operations remote from the litter device. The one or more litter devices may send one or more signals related to one or more cleaning cycles to a system for analysis. A system integrated with a litter device may be able to identify and/or alert a user of the presence of one or more animal waste behaviors anomalous to the average waste elimination behavior of the animal.

COPYRIGHT NOTICE

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

DETAILED DESCRIPTION

Figure 1:
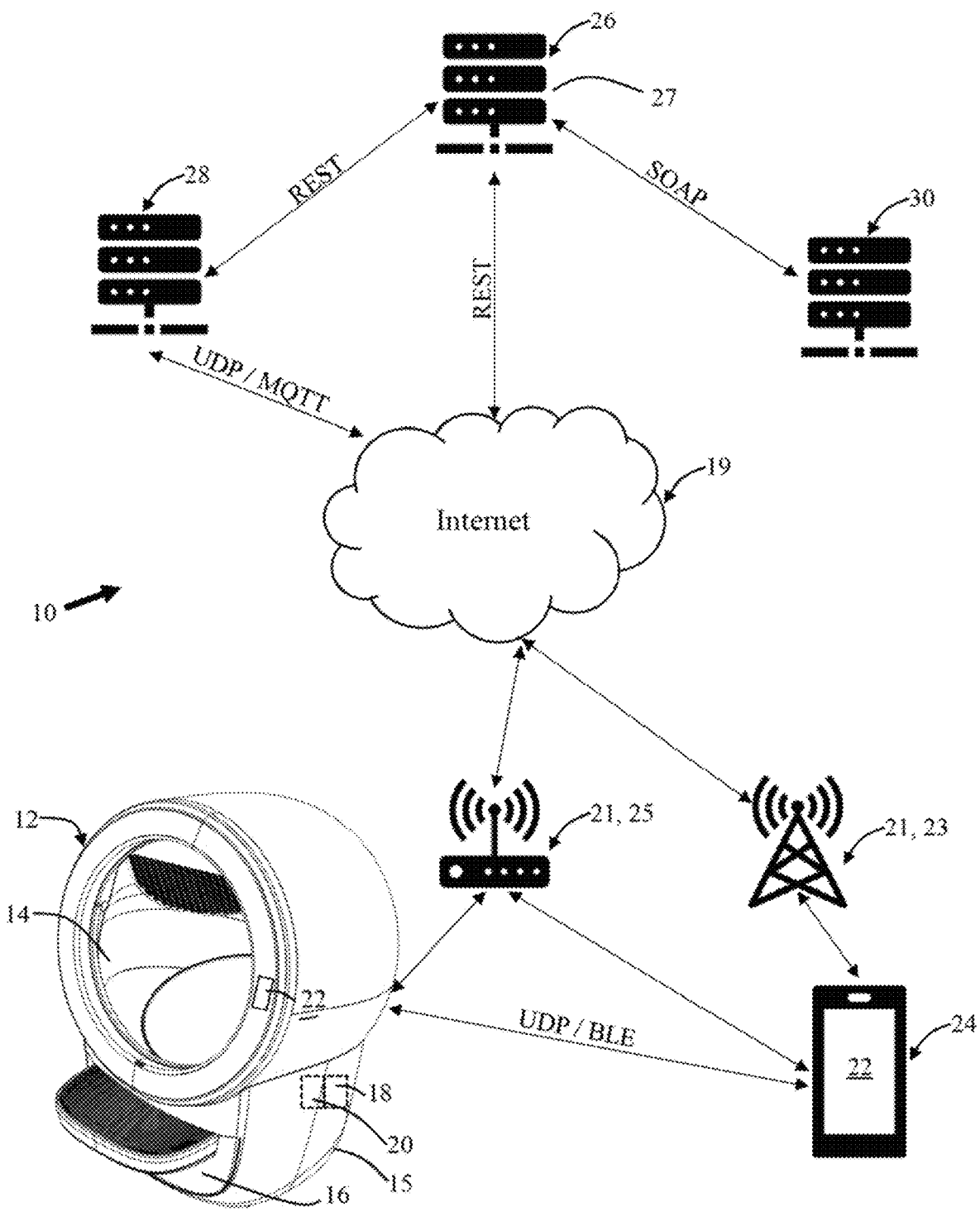
FIG. 1 illustrates a schematic of a system (e.g., network and devices) for operating an automated litter device, according to the teachings herein.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to an automated litter device. The litter device may be any device which includes litter for use by an animal. An animal may include any domesticated animal such as a cat, rabbit, pig, dog, or a combination thereof. The present teachings may be particularly useful for use with an automated litter device having both a chamber and a waste drawer. The chamber portion may be a portion of the device configured to hold litter, where an animal may enter and excrete waste, or both. The chamber may rotate through one or more cleaning cycles to allow for funneling and disposal of waste. Waste from the chamber may be disposed into a waste drawer, such as a waste drawer located in a support base of the device. A chamber portion, cleaning cycle of the chamber portion, support base, waste drawer, and other components of the litter device may be configured such as those disclosed in U.S. Pat. Nos. 8,757,094; and 9,433,185; and U.S. Provisional Application No. 62/837,965 which are incorporated by reference herein in their entirety for all purposes.

The automated litter device may include one or more sensors. The one or more sensors may function to detect one or more conditions of the device, receive one or more status signals, transmit one or more status signals, or a combination thereof. The one or more status signals may be related to one or more conditions of one or more components of the litter device. The one or more sensors may be located in any one or more portions of the litter device which may allow for a sensor to detect the presence and/or absence of one or more conditions of the one or more components. Based on the one or more conditions sensed, one or more sensors may transit one or more signals to one or more controllers, processors, communication modules, computing devices, or any combination thereof. One or more signals from one or more sensors may be converted into one or more status signals by one or more controllers, processors, communication modules, computing devices, or any combination thereof. One or more sensors may be adapted to detect one or more conditions related to: a mass, change in mass, or both of the litter device; a presence of waste, a level of waste, or both; the presence of light, light above, at, and/or below a lumen level, or a combination thereof; a connection between two or more components of the device (e.g., support base and bonnet); the presence of one or more pinch conditions; one or more positions of a chamber; an operating condition of a motor; or any combination thereof. The one or more sensors may include one or more waste drawer sensors (e.g., indicator), mass or presence sensors, light sensors, interlock sensors, pinch detectors, position sensors, motor sensors (e.g., one or more laser sensors, distance sensors,) or any combination thereof.

The litter device may include one or more waste drawer sensors. The one or more waste drawer sensors may function to detect a predetermined level of contents, a real-time level of contents, or both within a waste drawer. The one or more waste drawer sensors may be located anywhere within the litter device such that the one or more waste drawer sensors may sense a level of contents within a waste drawer. The one or more waste drawer sensors may be located in a support base, waste drawer, chamber, bezel, in proximity to an entry opening, or a combination thereof. The one or more waste drawer sensors may be any type of sensor suitable for detecting, monitoring, and/or a level of contents within a waste drawer. One or more waste drawer sensors may include one or more mass sensors, capacitive sensors, infrared sensors, laser sensors, ultrasonic sensors, membrane sensors, radio frequency (RF) admittance sensors, conductive sensors, optical interface sensors, microwave sensors, the like, or combination thereof. Suitable waste drawer sensors and configurations may be that of one or more indicators as described in U.S. Pat. No. 9,422,185, lasers as described in U.S. Provisional Application No. 62/837,965, or a combination of both. Exemplary combinations of one or more waste drawer sensors may include two or more infrared sensors opposing one another, one or more laser beams, a laser beam sensor and infrared sensor combination, or any combination thereof. One waste drawer sensor may include a light beam transmitter and one waste drawer sensor may include a light beam detector. The light beam transmitter may relay a light beam to the light beam detector such that the light beam is detected. A waste drawer may be indicated as at least partially full once the waste within the drawer interferes with the light beam, such that the light beam is no longer detected by the light beam detector. Another example of a waste drawer sensor may include one or more laser sensors affixed near an entry opening of the chamber or an interior upper surface of the chamber opposite a waste drawer. The one or more laser sensors may include one or more cone sensors. The one or more laser sensors may be arranged to have a line of sight into a waste drawer. The one or more laser sensors may have line of sight when a waste opening of a chamber is aligned with a waste drawer, such as during a cleaning cycle. The one or more waste drawer sensors may be in communication with one or more controllers, computing devices, processors, communication modules, or any combination thereof. The one or more waste drawer sensors may be directly and/or indirectly connected to one or more controllers, computing devices, processors, communication modules, or any combination thereof. The one or more waste drawer sensors may relay one or more signals related to a level of contents within a waste drawer to one or more controllers. The one or more waste drawer sensors may relay a presence of waste above a predetermined level, a real-time level of contents, or both to one or more controllers, computing devices, processors, communication modules, or any combination thereof. A signal from one or more waste drawer sensors to one or more controllers, computing devices, processors, communication modules, or any combination thereof related to the level of contents may be a waste level signal.

The litter device may include one or more mass sensors (e.g., presence sensors). The one or more mass sensors may function to monitor a mass of the litter device, such as a mass within the chamber; a presence of an animal within the litter device; or both. A mass sensor may continuously, intermittently, or both monitor a mass of or presence of an animal within the litter device. The mass sensor may be located at any location in the device so that any change in mass of the litter device, presence of an animal within the device, or both may be detected. The mass sensor may be located at a location in the device so that rotation of the chamber may be prevented if additional mass over a predetermined mass is located within the chamber, if an animal is detected within the chamber, or both. The predetermined mass may be a mass over a mass of litter within a unit, a mass set by a user, below a mass of an animal, or any combination thereof. The mass sensor may include one or more resistors, force sensors, switches, controllers, microprocessors, laser sensors, or a combination thereof. A suitable mass sensor and configuration within a litter device may be as described in U.S. Pat. No. 9,422,185. Another suitable laser sensor configuration for detecting presence of an animal may be the one or more laser sensors as described in U.S. Provisional Application No. 62/837,965. The one or more mass sensors may be in communication with one or more controllers, computing devices, processors, communication modules, or any combination thereof. The one or more mass sensors may be directly and/or indirectly connected to one or more controllers, computing devices, processors, communication modules, or any combination thereof. The one or more mass sensors may relay one or more signals related a monitored mass to one or more controllers, computing devices, processors, communication modules, or any combination thereof. The one or more mass sensors may relay a presence of mass above a predetermined mass, a real-time mass, or both to one or more controllers, computing devices, processors, communication modules, or any combination thereof. A signal from one or more mass sensors relayed to one or more controllers, computing devices, processors, communication modules, or any combination thereof related to the mass within the litter device may be referred to as a mass signal.

The litter device may include one or more light sensors. The one or more light sensors may function to detect a light level within the litter device, about the outside surface of the litter device (e.g., ambient light), or both. The one or more light sensors may be any sensor suitable for detecting light within the litter device, outside of the litter device, or both. The one or more light sensors may be any sensor suitable for detecting a light reading below a predetermined lumen level. The one or more light sensors may be in direct or indirect connection with one or more lights. Reading of a light level below a predetermined lumen level may cause one or more lights within the litter device to turn on. The one or more light sensors may cooperate with one or more other sensors, such as a mass sensor. One or more lights within the litter device may turn on if a light level below a predetermined lumen level is detected by one or more or more light sensors and a mass above a predetermined mass level is detected by one or more mass sensors. Exemplary suitable light sensors and configurations within a litter device may be as described in U.S. Pat. No. 9,422,185. The one or more light sensors may be in communication with one or more controllers, computing devices, processors, communication modules, or any combination thereof. The one or more light sensors may be directly and/or indirectly connected to one or more controllers, computing devices, processors, communication modules, or any combination thereof. The one or more light sensors may relay one or more signals related to a monitored light level to one or more controllers, computing devices, processors, communication modules, or any combination thereof. The one or more light sensors may relay the presence of light at, below, or above a predetermined lumen level to one or more controllers, computing devices, processors, communication modules, or any combination thereof. A signal from one or more light sensors relayed to one or more controllers, computing devices, processors, communication modules, or any combination thereof related to a light level within or outside of the litter device may be referred to as a light signal.

The litter device may include one or more interlock sensors. The one or more interlock sensors may detect a connection, broken connection, or both between a bonnet and a support base. The one or more interlock sensors may detect if one or both sides, retaining clips, or both are partially removed, completely removed, or both. The one or more interlock sensors may sense power being supplied or not supplied to a bonnet through one or more connection points to the support base. The one or more interlock sensors may include one or more low current electrical sensors. One or more exemplary interlock sensors and configurations within a litter device may be as described in U.S. Pat. No. 9,422,185. The one or more interlock sensors may be in communication with one or more controllers, computing devices, processors, communication modules, or any combination thereof. The one or more interlock sensors may be directly and/or indirectly connected to one or more controllers, computing devices, processors, communication modules, or any combination thereof. The one or more interlock sensors may relay one or more signals related to a power being supplied or not supplied to the bonnet to one or more controllers, computing devices, processors, communication modules, or any combination thereof. A signal from one or more interlock sensors relayed to one or more controllers, computing devices, processors, communication modules, or any combination thereof may be referred to as an interlock signal. Upon receiving and/or upon the absence of an interlock signal to one or more controllers, computing devices, processors, communication modules, or any combination thereof, the one or more controllers, computing devices, processors, communication modules, or any combination thereof may prevent and/or allow rotation of the chamber.

The litter device may include one or more pinch detectors. The one or more pinch detectors may detect the presence of one or more pinch conditions. The one or more pinch detectors may be located anywhere within the litter device suitable for detecting one or more pinch conditions. The one or more pinch detectors may be located proximate to any pinch points within the litter device. One or more pinch detectors may be located within a litter device so that a pinch detector is contacted before an edge of the chamber, the waste opening, the support base, the bonnet, the waste drawer, any other components of the litter device, or a combination thereof. One or more exemplary pinch detectors and configurations within a litter device may be as described in U.S. Pat. No. 9,422,185. The one or more pinch detectors may be in communication with one or more controllers, computing devices, processors, communication modules, or any combination thereof. The one or more pinch detectors may be directly and/or indirectly connected to one or more controllers, computing devices, processors, communication modules, or any combination thereof. The one or more pinch detectors may relay one or more signals related to the presence and/or absence of a pinch condition. A signal from one or more pinch detectors to one or more controllers may be referred to as a pinch signal. Upon receiving a pinch signal at one or more controllers, computing devices, processors, communication modules, or any combination thereof, the one or more controllers may prevent rotation of a controllers, computing devices, processors, communication modules, or any combination thereof. During the absence of a pinch signal at one or more controllers, the one or more controllers, computing devices, processors, communication modules, or any combination thereof may allow for rotation of a chamber.

The litter device may include one or more position sensors. The one or more position sensors may monitor a position of a chamber. The one or more position sensors may be any sensor that may detect a position of a chamber relative to a support base, a waste drawer, a bonnet, or any combination thereof. The one or more sensors may include one or more Hall Effect sensors. One or more exemplary position sensors and configurations within a litter device may be as described in U.S. Pat. No. 9,422,185. The one or more position sensors may be in communication with one or more controllers, computing devices, processors, communication modules, or any combination thereof. The one or more position sensors may be directly and/or indirectly connected to one or more controllers, computing devices, processors, communication modules, or any combination thereof. The one or more position sensors may relay one or more signals related to a position of a chamber to one or more controllers, computing devices, processors, communication modules, or any combination thereof. A signal from one or more position sensors to one or more controllers, computing devices, processors, communication modules, or any combination thereof may be referred to as a position signal.

The litter device may include one or more motor sensors. The one or more motor sensors may monitor functionality of one or more motors located within the litter device. The one or more motor sensors may be any sensor which may detect a position, torque, temperature, speed, the like, or any combination thereof of one or more motors within the litter device. The one or more sensors may include one or more position sensors, laser sensors, torque sensors, temperature sensors, speed sensors, the like, or any combination thereof. The one or more motor sensors may be in communication with one or more controllers, computing devices, processors, communication modules, or any combination thereof. The one or more motor sensors may relay one or more signals related to one or more conditions of a motor to one or more controllers, computing devices, processors, communication modules, or any combination thereof. A signal from one or more motor sensors to one or more controllers, computing devices, processors, communication modules, or any combination thereof may be referred to as a motor signal.

The automated litter device may include one or more controllers. The one or more controllers may function to receive one or more signals, transmit one or more signals, control operations of one or more components of the litter device, or a combination thereof. The one or more controllers may be in communication with one or more sensors. The one or more controllers may be adapted to receive one or more signals from the one or more sensors. The one or more controllers may be in communication with one or more sensors. The one or more controllers may be in electrical communication with one or more sensors. The one or more controllers may interpret one or more signals from one or more sensors as one or more status signals. The one or more controllers may automatically receive, interpret, and/or transmit one or more signals. The one or more controllers may automatically control one or more operations of one or more components upon receive of one or more signals or instructions. The one or more controllers may reside within or be in communication with the litter device. The one or more controllers may be located within or affixed to a support base, chamber, or both. The one or more controllers may include one or more controllers, microcontrollers, microprocessors, processors, storage mediums, or a combination thereof. One or more suitable controllers may include one or more controllers, microprocessors, or both as described in U.S. Pat. Nos. 8,757,094; and 9,433,185. The one or more controllers may be in communication with and/or include one or more communication modules. The one or more controllers may include one or more processors.

The automated litter device may include one or more communication modules. The one or more communication modules may allow for the litter device to receive and/or transmit one or more signals from one or more computing devices, be integrated into a network, or both. The one or more communication modules may have any configuration which may allow for one or more data signals from one or more controllers to be relayed to one or more other controllers, communication modules, communication hubs, networks, computing devices, processors, the like, or any combination thereof located external of the litter device. The one or more communication modules may include one or more wired communication modules, wireless communication modules, or both. A wired communication module may be any module capable of transmitting and/or receiving one or more data signals via a wired connection. One or more wired communication modules may communicate via one or more networks via a direct, wired connection. A wired connection may include a local area network wired connection by an ethernet port. A wired communication module may include a PC Card, PCMCIA card, PCI card, the like, or any combination thereof. A wireless communication module may include any module capable of transmitting and/or receiving one or more data signals via a wireless connection. One or more wireless communication modules may communicate via one or more networks via a wireless connection. One or more wireless communication modules may include a Wi-Fi transmitter, a Bluetooth transmitter, an infrared transmitter, a radio frequency transmitter, an IEEE 802.15.4 compliant transmitter, the like, or any combination thereof. A Wi-Fi transmitter may be any transmitter compliant with IEEE 802.11. A communication module may be single band, multi-band (e.g., dual band), or both. A communication module may operate at 2.4 Ghz, 5 Ghz, the like, or a combination thereof. A communication module may communicate with one or more other communication modules, computing devices, processors, or any combination thereof directly; via one or more communication hubs, networks, or both; via one or more interaction interfaces; or any combination thereof.

The automated litter device may be in communication with a communication hub. A communication hub may function to receive one or more signals, transfer one or more signals, or both from one or more other computing devices. The communication hub may be any type of communication hub capable of sending and transmitting data signals over a network to one or a plurality of computing devices. The communication hub may include a wired router, a wireless router, an antenna, a satellite, or any combination thereof. For example, an antenna may include a cellular tower. The communication hub may be connected to the litter device, one or more computing devices, or both a via wired connection, wireless connection, or a combination of both. For example, the communication hub may be in wireless connection with the litter device via the communication module. The communication hub may allow for communication of a computing device with the litter device when the computing device is directly connected to the communication hub, indirectly connected to the communication hub, or both. A direct connection to the communication hub may mean that the computing device is directly connected to the communication hub via a wired and/or wireless connection and communicates with the litter device through the communication hub. An indirect connection to the communication hub may mean that a computing device first communicates with one or more other computing devices via a network before transmitting and/or receive one or more signals to and/or from the communication hub and then to the litter device.

The automated litter device may be integrated into one or more networks. The automated litter device may be in removable communication with one or more networks. The one or more networks may be formed by placing the litter device in communication with one or more other computing devices. One or more networks may include one or more communication hubs, communication modules, computing devices, or a combination thereof as part of the network. One or more networks may be free of one or more communication hubs. One or more computing devices of the system may be directly connected to one another without the use of a communication hub. For example, a communication module of the litter device may be placed in direct communication with a communication module of a mobile communication device (e.g., mobile phone) without having a communication hub therebetween. One or more networks may be connected to one or more other networks. One or more networks may include one or more local area networks (LAN), wide area networks (WAN), intranet, Internet, Internet of Things (IoT), the like, or any combination thereof. The network may allow for the automated litter device to be in communication with one or more user interfaces remote from the device via the Internet, such as through one or more managed cloud services. An exemplary managed cloud service may include AWS IoT Core by Amazon Web Services®. The network may be temporarily, semi-permanently, or permanently connected to one or more computing devices, litter device, or both. A network may allow for one or more computing devices to be temporarily and/or permanently connected to the litter device to transmit one or more data signals to the litter device, receive one or more data signals from the device, or both. The network may allow for one or more signals from one or more controllers to be relayed through the system to one or more other computing devices, processors, storage mediums, the like, or any combination thereof. The network may allow for one or more computing devices to receive one or more data entries from and/or transmit one or more data entries to one or more storage mediums. The network may allow for transmission of one or more signals, status signals, data entries, instruction signals, or any combination thereof for processing by one or more processors.

Devices on the network may communicate via one or more protocols. The one or more protocols may allow for two or more devices part of the network or system to communicate with one another either while in direct or indirect communication, wireless or wired communication, via one or more communication hubs, or any combination thereof. The one or more protocols may be any protocol suitable for use in telecommunications. The one or more protocols may be suitable for wired, wireless, or both communication styles between devices within the network or system. The one or more protocols may allow the devices of the system to be connected to and communication with one another through the Internet. The network and protocols may allow for the devices to be an "Internet of Things" (IoT). The one or more protocols may be those compatible with cloud computing services. Exemplary cloud computing services may include Amazon Web Services®, Microsoft Azure®, Google Cloud®, IBM®, Oracle Cloud®, the like, or any combination thereof. One or more cloud computing services may be managed by one or more managed cloud services. Exemplary protocols may include simple object access protocol (SOAP), hypertext transfer protocol (HTTP), user datagram protocol (UDP), message queuing telemetry transport (MQTT), Bluetooth low energy (BLE) protocol, IEEE 802 family of standards, the like, or any combination thereof. For example, the automated litter device may connect wirelessly to a computing device using one or more protocols. Exemplary protocols may include UDP, BLE, and the like which allow for direct communication between devices. UDP and BLE may even be useful for allowing direct communication with devices without using the Internet as part of the network. As another example, an automated litter device may connect with a dispatch interface, interaction interface, or both via one or more protocols using the Internet. Exemplary protocols for communication from the litter device to a dispatch interface, interaction interface, or both may include UDP, MQTT, REST, and the like. As another example, a dispatch interface, interaction interface, or both may communicate with an authentication portal using one or more protocols either directly or indirectly through the Internet. Exemplary protocols for communication between a dispatch interface or interaction interface and an authentical portal may include REST, SOAP, MQTT, the like, or any combination thereof. Suitable protocols useful as IoT protocols may be those provided by "IoT Standards and Protocols" by Postscapes™ available at https://www.postscapes.com/internet-of-things-protocols/, incorporated herein in its entirety for all purposes.

The automated litter device may be integrated into a system. The system may allow for monitoring signals from, receiving signals from, and/or sending signals to an automated litter device. The system may allow for sending one or more instruction signals to a litter device. The system may allow for transmitting one or more signals, status signals, or both from the device. The system may allow for storing one or more data entries related to one or more signals. The system may allow for one or more algorithms to be executed remote from the litter device. The system may allow for controlling of one or more operations of an automated litter device while remote from the device. The system may include one or more communication hubs, computing devices, processors, storage mediums, databases, the like, or any combination thereof.

The automated litter device may include and/or be in communication with one or more computing devices. The one or more computing devices may function to receive and/or transmit one or more signals, convert one or more signals to data entries, to send one or more data entries to a storage medium, to store one or more data entries, to retrieve one or more data entries from a storage medium, to compute one or more algorithms, apply one or more rules, or any combination thereof. One or more computing devices may include or be in communication with one or more other computing devices, processors, storage mediums, databases, interaction devices, the litter device, or any combination thereof. One or more computing devices may communicate with one or more computing devices, processors, storage mediums, databases, or any combination thereof through an interaction interface, dispatch interface, or both. Communication between computing devices may be controlled or managed via a managed cloud service. The one or more computing devices may include one or more non-transient storage mediums. A non-transient storage medium may include one or more physical servers, virtual servers, or a combination of both. One or more servers may include one or more local servers, remote servers, or both. One or more computing devices may include one or more processors of a litter device, personal computers (e.g., laptop, desktop, etc.), mobile computing devices (e.g., tablet, mobile phone, etc.), or a combination thereof. One or more computing devices may use one or more processors.

One or more computing devices may include one or more processors. The one or more processors may function to analyze one or more signals from the litter device, one or more storage mediums, databases, communication modules, or any combination thereof. The one or more processors may be located within or in communication with one or more computing devices, servers, storage mediums, or any combination thereof. One or more processors may be in communication with one or more other processors. The one or more processors may function to process data, execute one or more algorithms to analyze data, apply one or more rules, evaluate data against one or more rules, or any combination thereof. The one or more processors may automatically process data, execute one or more algorithms, apply one or more rules, evaluate data, or a combination thereof; may wait for an instruction or signal such as from a user; or any combination thereof. Processing data may include receiving, transforming, outputting, executing, the like, or any combination thereof. One or more processors may be part of one or more hardware, software, systems, or any combination thereof. One or more hardware processors may include one or more central processing units, multi-core processors, front-end processors, the like, or any combination thereof. One or more software processors may include one or more word processors, document processors, the like, or any combination thereof. One or more system processors may include one or more information processors, the like, or a combination thereof. One or more processors suitable for use within the litter device as part of the one or more controller may include a microcontroller, such as Part No. PIC18F45K22 and/or Part No. PIC18F46J50 produced by Microchip Technology Inc., incorporated herein by reference in their entirety for all purposes. The one or more processors may be located within a same or different non-transient storage medium as one or more storage mediums, other processors, communication modules, communication hubs, or any combination thereof. The one or more processors may include one or more cloud-based processors. A cloud-based processor may be part of or in communication with a dispatch interface, an interaction interface, an authentication portal, or a combination thereof. A cloud-based processor may be located remote from a litter device, a computing device, one or more other processors, one or more databases, or any combination thereof. Cloud-based may mean that the one or more processors may reside in a non-transient storage medium located remote from the litter device, computing device, processor, databases, or any combination thereof. One or more cloud-based processors may be accessible via one or more networks. A suitable cloud-based processor may be Amazon Elastic Compute Cloud™ (EC2™) may be provided by Amazon Web Services®, incorporated herein by reference in its entirety for all purposes. Another suitable platform for a cloud-based processor may include Lambda™ provided by Amazon Web Services®, incorporated herein in its entirety by reference for all purposes. The one or more processors may convert data signals to data entries to be saved within one or more storage mediums. The one or more processors may access one or more algorithms to analyze one or more data entries and/or data signals. The one or more processors may access one or more algorithms saved within one or more memory storage mediums. The one or more algorithms being accessed by one or more processors may be located in a same or different storage medium or server as the processor(s).

One or more computing devices may include one or more memory storage mediums. The one or more memory storage mediums may include one or more hard drives (e.g., hard drive memory), chips (e.g., Random Access Memory "RAM)"), discs, flash drives, memory cards, the like, or any combination thereof. The one or more storage mediums may include one or more cloud-based storage mediums. A cloud-based storage medium may be located remote from a litter device, a computing device, one or more processors, one or more databases, or any combination thereof. Cloud-based may mean that the one or more storage mediums may reside in a non-transient storage medium located remote from the litter device, computing device, processor, other databases, or any combination thereof. One or more cloud-based storage mediums may be accessible via one or more networks. A suitable cloud-based storage medium may be Amazon S3™ provided by Amazon Web Services®, incorporated herein by reference in its entirety for all purposes. One or more memory storage mediums may store one or more data entries in a native format, foreign format, or both. One or more memory storage mediums may store data entries as objects, files, blocks, or a combination thereof. The one or more memory storage mediums may include one or more algorithms, rules, databases, data entries, the like, or any combination therefore stored therein. The one or more memory storage mediums may store data in the form of one or more databases.

One or more computing devices may include one or more databases. The one or more databases may function to receive, store, and/or allow for retrieval of one or more data entries. The one or more databases may be located within one or more memory storage mediums. The one or more databases may include any type of database able to store digital information. The digital information may be stored within one or more databases in any suitable form using any suitable database management system (DBMS). Exemplary storage forms include relational databases (e.g., SQL database, row-oriented, column-oriented), non-relational databases (e.g., NoSQL database), correlation databases, ordered/unordered flat files, structured files, the like, or any combination thereof. The one or more databases may store one or more classifications of data models. The one or more classifications may include column (e.g., wide column), document, key-value (e.g., key-value cache, key-value store), object, graph, multi-model, or any combination thereof. One or more databases may be located within or be part of hardware, software, or both. One or more databases may be stored on a same or different hardware and/or software as one or more other databases. The databases may be located within one or more non-transient storage mediums. One or more databases may be located in a same or different non-transient storage medium as one or more other databases. The one or more databases may be accessible by one or more processors to retrieve data entries for analysis via one or more algorithms. The one or more databases may be one or more cloud-based databases. Cloud-based may mean that the one or more databases may reside in a non-transient storage medium located remote from the litter device. One or more cloud-based databases may be accessible via one or more networks. One or more databases may include one or more databases capable of storing one or more conditions of a litter device, one or more status signals related to a litter device, one or more instruction signals sent to a litter device, one or more users, one or more user accounts, one or more registered litter devices, one or more, the like, or any combination thereof. The one or more databases may include a Commands database, Activities database, Device database, Lifetime Cycles database, a User database, a User Computing Device database, a Registered Device database, a User Settings database, the like, or any combination thereof. One suitable database service may be Amazon DynamoDB® offered through Amazon Web Services®, incorporated herein in its entirety by reference for all purposes.

One or more computing devices may include one or more interaction interfaces. One or more interaction devices may function to transmit and/or relay one or more data signals, data entries, or both from one or more computing devices, processors, storage mediums, databases, or a combination thereof to one or more other computing devices, processors, storage mediums, databases, or a combination thereof. One or more interaction interfaces may include one or more application programming interfaces (API). The one or more interaction interfaces may utilize one or more architectures. The one or more architectures of an interaction interface may be one or more web service architectures useful for requesting, receiving and/or transmitting one or more data signals, data entries, or both from one or more other remotely located computing devices connected via one or more networks (e.g., web-based resources). One or more web service architectures may include Representation State Transfer (REST), gRPC, the like, or any combination thereof. One suitable interaction interface which is a REST API may be Amazon API Gateway™ provided by Amazon Web Services®, incorporated herein by reference in its entirety for all purposes. The one or more interaction interfaces may utilize one or more protocols for transmitting and/or receiving one or more data signals, data entries, or both. One or more protocols may include simple object access protocol (SOAP), hypertext transfer protocol (HTTP), user datagram protocol (UDP), message queuing telemetry transport (MQTT), the like, or any combination thereof.

The system in which the litter device is integrated into may include and/or be connected to one or more authentication controls. One or more authentication controls may function to control access of a user to one or more litter devices, computing devices, processors, storage mediums, databases, interaction interfaces, e-commerce platforms, the like, or any combination thereof. The one or more authentication controls may be in communication with one or more components of the system via one or more networks. The one or more authentication controls may communicate with one or more other components of the system via one or more interaction interfaces. The one or more authentication controls may receive one or more user credentials via one or more user interfaces of one or more computing devices. One or more user credentials may include one or more data entries related to one or more user accounts. One or more user credentials may include one or more user login identifications (e.g., "user ID"), passwords, the like, or a combination thereof. One or more authentication controls may include one or more authentication algorithms. The one or more authentication algorithms may compare the one or more user credentials provided via a user interface with one or more data entries residing within one or more databases, such as a User Database and/or User Settings Database. If the one or more user credentials match one or more data entries, the one or more authentication algorithms may instruct one or more computing devices, processors, or both to allow a user to access one or more data entries, receive one or more data signals, transmit one or more instruction signals, or any combination thereof. A suitable authentication control may include Amazon Cognito™ available through Amazon Web Services®, incorporated herein by reference in its entirety for all purposes. One or more authentication controls may cooperate with one or more e-commerce platforms. One or more authentication controls may authenticate one or more users based on one or more user credentials received from one or more e-commerce platforms, stored within one or more databases of one or more e-commerce platforms, or both.

The system in which the litter device is integrated may include and/or be connected to one or more e-commerce platforms. The one or more e-commerce platforms may function establish one or more user accounts, edit one or more user accounts, authenticate one or more users, allow for purchase of one or more litter devices, or any combination thereof. An exemplary e-commerce platform may include Magento® sold by Magento Inc. The one or more e-commerce platforms include one or more authentication portals. The one or more authentication portals may allow for one or more e-commerce platforms to be placed into communication with one or more components of the system. The one or more e-commerce platforms may allow for an e-commerce platform to be placed in communication with one or more interaction interfaces, computing devices, processors, storage mediums, databases, dispatch interfaces, litter devices, or any combination thereof. The one or more authentication portals may include communication between one or more authentication controls and one or more e-commerce platforms. The one or more authentication portals may allow for one or more user credentials entered via one or more authentication controls to be verified via one or more e-commerce platforms, vice-versa, or both.

One or more computing devices may include one or more user interfaces. The one or more user interfaces may function to display information related to a litter device, receive user inputs related to the litter device, transmit information related to the litter device, or any combination thereof. The one or more user interfaces may be located on the litter device, a separate computing device, or both. One or more user interfaces may be part of one or more computing devices. One or more user interfaces may include one or more interfaces capable of relaying information (e.g., data entries) to a user, receiving information (e.g., data signals) from a user, or both. One or more user interfaces may display information related to the litter device. One or more user interfaces may display information from one or more algorithms. The user interface may allow for inputting of information related to the litter device. Information may include a user name, password, one or more instruction signals, the like, or any combination thereof. The one or more user interfaces may include one or more graphic user interfaces. The one or more graphic interfaces may include one or more screens. The one or more screens may be a screen located directly on the litter device, another computing device, or both. The one or more screens may be a screen on a mobile computing device, non-mobile computing device, or both. The one or more graphic interfaces may include and/or be in communication with one or more user input devices. The one or more user input devices may allow for receiving one or more inputs (e.g., instruction signals) from a user. The one or more input devices may include one or more buttons, wheels, keyboards, switches, touchscreens, the like, or any combination thereof. The one or more input devices may be integrated with a graphic interface. The one or more input devices may include one or more touch-sensitive monitor screens.

One or more computing devices may include on or more algorithms stored therein. For example, one or more algorithms may be stored within one or more storage mediums of an interaction interface. The one or more algorithms may function to analyze one or more signals, determine one or more conditions of the litter device, relay one or more conditions to one or more user interfaces, receive one or more instructions from one or more user interfaces, initiate one or more operations, identify one or more faults, or any combination thereof. The one or more algorithms may be executed automatically by the one or more computing devices (e.g., processors of the computing device), may wait for an input for a user, or both. A sensed condition may cause one or more algorithms to be executed automatically. One or more algorithms may include one or more waste detection algorithms, waste drawer algorithms, animal health algorithms, fault algorithms, instruction algorithms, or a combination thereof.

One or more algorithms may include one or more waste detection algorithms. One or more waste detection algorithms may function to convert one or more waste level signals to one or more waste level status signals, allow for execution of one or more cleaning cycles based on a level of waste, prevent one or more cleaning cycles based on a level of waste, or any combination thereof. The one or more waste detection algorithms may be accessible by one or more controllers, processors, or both. The one more waste detection algorithms may be stored within the litter device, remote from the litter device, or both. Storage of the one or more waste detection algorithms within the litter device, such as a controller of the litter device, may allow for the one or more processors to relay a level of fullness of a waste drawer to at least one user interface, stop rotation of the chamber, or both without the litter device being connected to a system. In other words, by the one or more waste detection algorithms being programmed into a controller located within the litter device, the litter device may be able to function offline without a network connection. The one or more waste detection algorithms may receive one or more waste level signals from one or more waste drawer sensors via one or more processors. The one or more waste drawer sensors may include a single waste drawer sensor or a plurality of waste drawer sensors. A single waste drawer sensor may detect a specific level of presence of waste or may detect varying levels of waste. For example, a plurality of sensors may be located within the waste drawer sensor and each sensor or a plurality of sensors in combination detect one or more predetermined volumes of waste within the waste drawer. One or more waste sensors may include one or more getting full waste sensors, one or more almost full waste sensors, one or more unit full waste sensors, or any combination thereof. As an alternative example, one or more laser sensors may be located within the waste drawer which may scan for a real-time level of waste within the waste drawer. The one or more waste drawer sensors may relay one or more waste level signals to one or more processors. The one or more waste level signals may include the presence, absence, or both of waste detected by a waste sensor; a level of waste detected by a waste sensor; or both. The one or more waste algorithms may instruct the one or more processors to convert the one or more waste level signals to one or more waste level status signals. The one or more waste algorithms may instruct one or more processors to send the one or more the one or more waste level signals, waste level status signals, or both to one or more storage mediums, databases, or both as one or more waste level data entries. The one or more waste algorithms may instruct one or more processors to apply one or more waste level rules. The one or more waste level rules may be part of the of the one or more waste algorithms. The one or more waste level rules may include a getting-full-rule, almost-full-rule, and a unit-full-rule.

A getting-full-rule may include receiving a waste level signal, waste level status signal, and/or waste level data entry indicating the waste drawer is getting full. Getting full may include the waste drawer being filled with a volume of waste about 60% or greater, about 70% or greater, or even about 80% or greater than a total available volume of the waste drawer. Getting full may include the waste drawer being filled with a volume of waste about 90% or less, about 85% or less, or even about 82% or less than a total available volume of the waste drawer. A getting-full-rule may include instructing one or more processors to relay the waste level signal, status signal, and/or data entry to one or more user interfaces. A user may be able to refer to a graphic user interface (e.g., interface on litter device, interface of mobile computing device, etc.) to see a notification that the waste drawer is getting full. A user may receive a notification via a graphic user interface that the waste drawer is getting full (e.g., between about 60% to about 90% full of waste).

An almost-full-rule may include receiving a waste level signal, waste level status signal, and/or waste level data entry indicating the waste drawer is almost full. Almost full may include the waste drawer being filled with a volume of waste about 80% or greater, about 83% or greater, or even about 87% or greater than a total available volume of the waste drawer. Almost full may include the waste drawer being filled with a volume of waste about 95% or less, about 93% or less, or even about 90% or less than a total available volume of the waste drawer. An almost-full-rule may include instructing one or more processors to relay the waste level signal, status signal, and/or data entry to one or more user interfaces. A user may be able to refer to a graphic user interface (e.g., interface on litter device, interface of mobile computing device, etc.) to see a notification that the waste drawer is almost full. A user may receive a notification via a graphic user interface that the waste drawer is almost full (e.g., between about 80% to about 95% full of waste).

A unit-full-rule may include receiving a waste level signal, waste level status signal, and/or waste level data entry indicating the waste drawer is full. Full may include the waste drawer being filled with a volume of waste about 95% or greater, about 96% or greater, or even about 97% or greater than a total available volume of the waste drawer. Full may include the waste drawer being filled with a volume of waste about 100% or less, about 99% or less, or even about 98% or less than a total available volume of the waste drawer. A unit-full-rule may include instructing one or more processors to relay the waste level signal, status signal, and/or data entry to one or more user interfaces. A user may be able to refer to a graphic user interface (e.g., interface on litter device, interface of mobile computing device, etc.) to see a notification that the waste drawer is full. A user may receive a notification via a graphic user interface that the waste drawer is full (e.g., between about 95% to about 100% full of waste). A unit-full-rule may include instructing one or more processors to prevent execution of one or more cleaning cycles, rotation of a chamber, or both. A unit-full-rule may include instructing one or more processors to prevent rotation of one or more motors.

One or more algorithms may include one or more waste drawer algorithms. The one or more waste drawer algorithms may function to estimate how many cleaning cycles are available before a waste drawer is full, a level of waste contents within a waste drawer, or both. The one or more waste drawer algorithms may be accessible by one or more processors. The one or more processors may be located within the device (e.g., a controller), remote from the device (e.g., cloud-based processor), or both. The one or more waste drawer algorithms may instruct one or more processors to reset one or more clean cycle counts; count cleaning cycles between two or more waste level signals to calculate one or more clean cycle counts; average the number of clean cycle counts occurring between a plurality of waste level signals; calculate a number of cleaning cycles remaining before receiving a waste level signal, or any combination thereof. The one or more waste drawer algorithms may include one or more reset count algorithms, counting algorithms, waste drawer status algorithms, or any combination thereof.

The one or more waste drawer algorithms may include one or more reset count algorithms. The one or more reset count algorithms may function to reset a count (e.g., set to zero) of cleaning cycles. The one or more reset count algorithms may be accessible by one or more controllers, processors, or both. The one or more reset count algorithms may be stored within the litter device (e.g., controller), remote from the litter device, or both. The one or more reset count algorithms may instruct one or more processors to reset one or more clean cycle counts, transfer one or more completed cycle counts to a storage medium, or both. The one or more reset count algorithms may instruct one or more processors to transmit one or more completed cycle counts to a storage medium, one or more databases, or both. The one or more completed counts may be transferred by the one or more processors as one or more completed count signals. The one or more completed count signals may be stored within one or more storage mediums as one or more completed count data entries. Upon transmitting the one or more completed count signals to a storage medium, saving the one or more completed count data entries in the storage medium, or both, one or more reset count algorithms may instruct one or more processors to reset one or more clean cycle counts to zero.

One or more reset count algorithms may be initiated by one or more reset instructions. One or more reset instructions may include one or more users initiating a reset count algorithm via one or more user interfaces; a cleaning cycle occurring without a waste level signal; or both. One or more user interfaces may display and/or include a reset count interface. For example, the reset count interface may be a physical button on the litter device, a virtual button on a graphic interface of the litter device or a mobile computing device, or both. The one or more user interfaces may display a reset count interface after one or more cleaning cycles. The one or more user interfaces may display a reset count interface after a cleaning cycle is completed; no waste level signal (e.g., getting full, almost full, full) is triggered; or a combination thereof. The one or more user interfaces may display a reset count interface after a cleaning cycle is completed and a waste level signal has been cleared. A waste level signal may be cleared upon a cleaning cycle occurring without a waste level signal being triggered subsequently after a cleaning cycle occurring under the presence of, or which triggers a, waste level signal. For example, a cleaning cycle may trigger a waste level full signal and then a cleaning cycle may occur in which there is no presence of a waste level full signal. The waste level full signal may no longer be present after a user may have emptied a waste drawer, removed some waste contents from the waste drawer, or even moved (e.g., shaken) the waste drawer to evenly distribute the waste contents within the waste drawer. The waste level full signal may no longer be present as one or more waste level sensors may no longer detect the presence, height, and/or volume of waste contents within the waste drawer. Upon displaying one or more reset counter interfaces, one or more reset count algorithms may instruct one or more processors to apply one or more reset rules.

The one or more reset count algorithms may include one or more reset rules. One or more reset rules may instruct a processor to reset a count, instruct a processor to continue with a current count, or both. The one or more reset interfaces may allow for a user to select from an affirmative response, negative response, or not select a response. An affirmative response may include a user confirming a waste drawer has been emptied, is empty, or both. A negative response may include a user confirming a waste drawer was not emptied, is not empty, or both. Not selecting a response may include not selecting either of the affirmative response or negative response. The one or more reset rules may instruct one or more processors to reset one or more counts, transmit one or more completed count data signals, or both if one or more affirmative responses are received by a reset counter interface. The one or more reset rules may instruct one or more processors to continue counting and aggregating each occurrence of a cleaning cycle if a negative response is received by the reset counter interface. The one or more reset rules may instruct one or more processors to continue executing one or more counting algorithms if a negative response is received via the reset counter interface. The one or more reset rules may instruct one or more processors to transmit one or more completed data signals, continue counting and aggregating each occurrence of a clean cycle, or both if no response is received by the reset counter interface. If no response is received by the reset counter interface, the one or more reset rules may instruct one or more processors to transmit one or more completed data signals to one or more storage mediums, not to reset the counter, or both. If no response is received by the reset counter interface, the one or more reset rules may instruct one or more processors to continue counting the occurrences of cleaning cycles and aggregating with a previous count of cleaning cycles. If no response is received by the reset counter interface, the one or more reset rules may instruct one or more processors to continue executing one or more count algorithms. If no response is selected, the one or more processors may execute one or more count algorithms until a reset count algorithm is re-triggered by a new or subsequent waste level signal, one or more predetermined occurrences of cleaning cycles occur, or both. If a subsequent waste level signal occurs, the one or more reset rules may instruct one or more processors to re-initiate one or more reset algorithms from the start (e.g., triggering the one or more reset count interfaces). If no response is selected, the one or more reset rules may allow for a predetermined value of cleaning cycles to occur before instructing one or more processors to reset one or more counts. A predetermined value of a cleaning cycle may be the maximum number of cleaning cycles possible before a waste drawer is full of waste contents within the waste drawer, such as when the waste contents are evenly distributed within the waste drawer. For example, a predetermined value of a cleaning cycle may be the maximum number of cleaning cycles possible before a waste drawer is full after the waste drawer is shaken by a user, as opposed to emptying the waste drawer. A predetermined value of cleaning cycles may include 1 or more cleaning cycles, 5 or more cleaning cycles, or even 8 or more cleaning cycles. A predetermined value of cleaning cycles may include 20 or less cleaning cycles, 15 or less cleaning cycles, or even 12 or less cleaning cycles. A predetermined value of cleaning cycles may be about 7 or more cleaning cycles to about 13 or less cleaning cycles (e.g., about 10 cleaning cycles). Once a predetermined value of cleaning cycles are executed, above the completed count, the one or more reset rules may instruct one or more processors to reset one or more counts, transmit one or more completed count data signals (i.e., either the original completed count before aggregating the predetermined cleaning cycles, or the completed count in addition to the count of predetermined cleaning cycles), or both (e.g., similar to the result from the rule if an affirmative response is received).

The one or more waste drawer algorithms may include one or more counting algorithms. The one or more counting algorithms may function to count and/or aggregate how many clean cycles occur between two or more waste level signals being triggered, two more waste level full signals being triggered, or both; how may clean cycles occur between a reset of a clean cycle count and one or more waste level signals, one or more waste level full signals, or both; or any combination thereof. The one or more counting algorithms may be accessible by one or more controllers, processors, or both. The one or more counting algorithms may be stored within the litter device (e.g., controller), remote from the litter device, or both. The one or more counting algorithms may instruct one or more processors to increase a count of cleaning cycles by 1, for every occurrence of a cleaning cycle. The one or more counting algorithms may instruct one or more processors to send a count of cleaning cycles to one or more storage mediums as one or more count data entries. The one or more counting algorithms may instruct one or more processors to increase one or more count data entries by 1 during and/or after execution of a cleaning cycle. The one or more counting algorithms may instruct one or more processors to replace one or more previous count data entries with one or more new count data entries. Upon initiation of one or more reset algorithms, one or more count data entries may be referred to as one or more completed count data entries. The one or more completed count data entries may be stored within one or more storage mediums, databases, or both based on one or more reset algorithms. The one or more completed count data entries may be utilized by one or more waste drawer status algorithms.

One or more waste drawer algorithms may include one or more waste drawer status algorithms. The one or more waste drawer status algorithms may function to inform a user how many estimated cleaning cycles remain before a waste drawer may be full, an estimated percentage of fullness of a waste drawer, an estimated duration until a waste drawer needs to be emptied, if one or more cleaning cycles are prevented from occurring as a waste drawer is full, or any combination thereof. The one or more waste drawer status algorithms may instruct one or more processors to display the estimated cleaning cycles remaining before full, percentage of waste drawer fullness, percentage of waste drawer capacity, estimated amount of time remaining before a waste drawer is full, or any combination thereof one or more interfaces. The one or more waste drawer status algorithms may be stored within a litter device (e.g., controller), remote from the litter device, or both. The one or more waste drawer status algorithms may be accessible by one or more controllers, processors, or both. One or more waste drawer status algorithms may instruct one or more processors to retrieve, average, or both a set quantity of count data entries from one or more storage mediums. One or more count data entries may include one or more completed count data entries, one or more predetermined-count-cycles-until-full, or both. A set quantity of count data entries may include a plurality of count data entries. A set quantity of count data entries may include 1 or more, 2 or more, 3 or more, or even 4 or more count data entries. A set quantity of count data entries may include 10 or less, 8 or less, or even 6 or less count data entries. For example, a set quantity of count data entries may be about 3 or more count data entries to about 5 or less count data entries (e.g., about 4 count data entries). Until a number of completed number of count data entries stored within a storage medium is equal to or greater than the set value of count data entries, the one or more waste drawer status algorithms may instruct a processor to use a predetermined-count-cycle-until-full as a placeholder. The one or more waste drawer status algorithms may include or refer to one or more predetermined-clean-cycles-until-full.

One or more predetermined-clean-cycles-until-full may be a number of cleaning cycles a litter device may perform until a waste drawer may be full of waste contents (e.g., starting from an empty waste drawer). One or more predetermined-clean-cycles-until-full may be based on a volume of the waste drawer, an average volume of waste from an animal, or both. One or more predetermined-clean-cycles-until-full may be about 10 cleaning cycles or more, about 15 cleaning cycles or more, about 20 cleaning cycles or more, about 25 cleaning cycles or more, or even about 30 cleaning cycles or more. One or more predetermined-clean-cycles-until-full may be about 60 cleaning cycles or less, about 55 cleaning cycles or less, about 50 cleaning cycles or less, about 45 cleaning cycles or less, or even about 40 cleaning cycles or less. One or more predetermined-clean-cycles-until-full may be anywhere from about 30 clean cycles or more to about 40 clean cycles or less (e.g., 36 clean cycles). One or more predetermined-clean-cycles-until-full values may be stored within one or more databases. One or more waste drawer status algorithms may instruct one or more processors to retrieve one or more completed count data entries from one or more storage mediums. One or more waste drawer status algorithms may instruct one or more processors to average the set quantity of count data entries to determine an estimated-clean-cycles-until-full-from-empty.

The one or more waste drawer status algorithms may instruct one or more processors to estimate cleaning cycles remaining before a waste drawer is full. The one or more waste drawer status algorithms may instruct one or more processors to calculate a difference between an estimated-clean-cycles-until-full-from-empty and one or more count data entries (e.g., from one or more count algorithms). The difference between the estimated-clean-cycles-until-full-from-empty and one or more count data entries may be referred to as the estimated-cleaning-cycles-remaining-before full.

The one or more waste drawer status algorithms may instruct one or more processors to calculate an estimated percentage of fullness of a waste drawer, estimated percentage of capacity remaining, or both. To calculate the estimated percentage of fullness, the one or more waste drawer status algorithms may instruct one or more processors to calculate the percentage or ratio of the one or more count data entries relative to the estimated-clean-cycles-until-full-from-empty. To calculate the estimated percentage of capacity remaining within a waste drawer, one or more waste drawer status algorithms may instruct one or more processors to calculate the percentage or ratio of the estimated cleaning cycles remaining before full relative to the estimated-clean-cycles-until-full-from-empty.

The one or more waste drawer status algorithms may instruct one or more processors to calculate an amount of time remaining before a waste drawer may be full (e.g., each the-estimated-clean-cycles-until-full-from-empty). The one or more waste drawer status algorithms may instruct one or more processors to determine an average time between cleaning cycles. The one or more waste drawer status algorithms may instruct one or more processors to calculate an average time between cleaning cycles for completed clean cycle data entries. The one or more waste drawer status algorithms may instruct one or more waste drawer status algorithms to calculate an estimated amount of time remaining before a waste drawer is full by multiplying an average time between cleaning cycles with the estimated cleaning cycles remaining before full.

One or more algorithms may include one or more animal health algorithms. The one or more animal health algorithms may function to detect a change in waste behavior of an animal, alert a user of a change in waste behavior of an animal, or both. The one or more animal health algorithms may be accessible by one or more controllers, processors, or both. The one or more animal health algorithms may be located within the litter device, remote from the litter device, or both. The one or more animal health algorithms may instruct one or more processors to alert a user of any waste patterns outside of one or more weekly, monthly, and/or yearly trends of waste patterns. A waste pattern may include a single occurrence or a plurality of occurrences. A waste pattern may include an average of a plurality of occurrences. The trends of waste patterns may include average time between cleaning cycles, average cleaning cycles until full, the like, or any combination thereof. The one or more animal health algorithms may instruct one or more processors to identify a user of waste patterns which deviate from one or more trends of waste patterns. One or more deviations may be referred to as one or more waste patterns which fall outside of a mean, variance, standard deviation, or a combination thereof relative to one or more trends of waste patterns. The one or more animal health algorithms may instruct one or more processors to interpret one or more deviations, relay one or more interpreted deviations to one or more user interfaces or both. Interpreting a deviation may include interpreting a deviation of a waste pattern into an actual animal behavior.

Interpreting a deviation in the average time elapsed between cleaning cycles may include applying a waste frequency rule by one or more processors. A waste frequency rule may instruct one or more processors that a deviation above an average time between cleaning cycles may be interpreted by one or more processors onto a user interface as an increase in time between utilizing the litter device, may suggest an animal may not be drinking and/or eating enough, may suggest waste habits of an animal are less frequent than usual, the like, or a combination thereof. A waste frequency rule may instruct one or more processors that a deviation below an average time between cleaning cycles may be interpreted by one or more processors onto a user interface as a decrease in time between utilizing the litter device, may suggest an animal may is drinking and/or eating more than usual, may suggest waste habits of an animal are more frequent than usual, the like, or a combination thereof.

Interpreting a deviation in average cleaning cycles until full may include applying a drawer full rule by one or more processors. A drawer full rule may instruct one or more processors that a deviation above an average cleaning-cycles-until-full-from empty may be interpreted by one or more processors onto a user interface as an increase in time between utilizing the litter device, may suggest waste contents of an animal are smaller in volume than usual, may suggest an animal may not be drinking and/or eating enough, may suggest waste habits of an animal are less frequent than usual, the like, or a combination thereof. A drawer full rule may instruct one or more processors that a deviation below an average cleaning-cycles-until-full-from-empty may be interpreted by one or more processors onto a user interface as a decrease in time between utilizing the litter device, may suggest waste contents of an animal are larger in volume than usual, may suggest an animal may is drinking and/or eating more than usual, may suggest waste habits of an animal are more frequent than usual, the like, or a combination thereof.

One or more algorithms may include one or more fault algorithms. One or more fault algorithms may function to detect one or more anomalous conditions based on one or more status signals, stop and/or prevent rotation of a chamber based on one or more status signals, prevent execution of one or more cleaning cycles based on one more status signals, communicate one or more anomalous conditions to a user interface, or any combination thereof. One or more fault algorithms may be accessible by one or more controllers, processors, or both. One or more fault algorithms may be stored within the litter device, remote from the litter device, or both. Storage of one or more fault algorithms within litter device, such as a controller of the litter device, may allow for one or more processors to stop and/or prevent rotation of a chamber, prevent execution of one or more cleaning cycles, or both without the litter device being connected to a system. The one or more fault algorithms may instruct one or more processors to transmit one or more fault conditions, warnings, or the like to one or more storage mediums, databases, or both. The one or more fault conditions may be stored within one or more storage mediums, databases, or both for a predetermined period of time. The one or more fault conditions may be stored for a period of about 1 day or greater, 5 days or greater or even 2 weeks or greater. The one or more fault conditions may be stored for a period of about 5 years or less, about 3 years or less, or even about 1 year or less. The one or more fault algorithms may receive one or more signals from one or more sensors. The presence, absence, change, or combination thereof of one or more signals from one or more sensors may indicate the presence of an anomalous condition. The one or more fault algorithms may be configured to receive one or more signals via one or more processors (e.g., controller) from one or more mass sensors, interlock sensors, pinch detectors, position sensors, motor sensors, or any combination thereof. The one or more fault algorithms may include one or more mass fault algorithms, pinch fault algorithms, interlock fault algorithms, position fault algorithms, motor fault algorithms, power fault algorithms, or any combination thereof.

The one or more fault algorithms may include one or more mass fault algorithms. The one or more mass fault algorithms may function to detect the presence of an animal within the litter device, detect a mass over a predetermined mass of the litter device, stop and/or prevent rotation of a chamber, prevent execution of a cleaning cycle, or any combination thereof. The one or more mass fault algorithms may be executed by one or more processors. One or more mass fault algorithms may be executed upon receipt of one or more mass signals from one or more mass sensors. The one or more mass fault algorithms may instruct the one or more processors to interpret one or more mass signals received from one or more mass sensors. Interpreting a mass signal may include converting the mass signal to a mass value (e.g., grams, kilograms, pounds, etc). The one or more mass fault algorithms may instruct the one or more processors to compare a mass signal, mass status signal, or both to one or more predetermined masses. The algorithm may include one or more predetermined masses stored therein. The one or more mass fault algorithms may instruct one or more processors to apply one or more mass rules. The one or more mass rules may include stopping and/or preventing rotation of a chamber, preventing execution of one or more cleaning cycles, or both if the mass signal, mass status signal or both indicate a mass greater than the predetermined mass. One or more mass rules may include instructing one or more processors to prevent rotation of one or more motors if a mass signal, mass status signal, or both are over a predetermined mass. The one or more mass rules may include instructing one or more processors to transmit the mass signal, mass status signal, mass fault, or a combination thereof to a user interface. A user may be able to refer to a graphic user interface (e.g., interface on litter device, interface of mobile computing device, etc.) to see a notification that the mass of the device is over the predetermined mass. A user may receive a notification via a graphic user interface that the mass of the device is over the predetermined mass.

The one or more fault algorithms may include one or more interlock fault algorithms. The one or more interlock fault algorithms may function to detect removal of a bonnet from a support base, stop and/or prevent rotation of a chamber, prevent execution of a cleaning cycle, or any combination thereof. The one or more interlock fault algorithms may be executed by one or more processors. One or more interlock fault algorithms may be executed upon receipt, change in, and/or absence of one or more interlock signals from one or more interlock sensors. The one or more fault algorithms may instruct one or more processors to interpret one or more interlock signals received from one or more interlock sensors. The one or more fault algorithms may instruct one or more processors to convert an interlock signal to an interlock status signal. The one or more fault algorithms may instruct one or more processors to apply one or more interlock rules. The one or more interlock rules may include stopping and/or preventing rotation of a chamber, preventing execution of one or more cleaning cycles, or both if one or more interlock signals, status signals, or both indicate a bonnet has been removed from a support base. One or more interlock rules may include instructing one or more processors to prevent rotation of one or more motors if an interlock signal, status signal, or both indicate a bonnet has been removed from a support base. The one or more interlock rules may include instructing one or more processors to transmit the interlock signal, status signal, interlock fault, or a combination thereof to a user interface. A user may be able to refer to a graphic user interface (e.g., interface on litter device, interface of mobile computing device, etc.) to see a notification that the bonnet of a device has been disconnected from the support base. A user may receive a notification via a graphic user interface that a bonnet of a device has been disconnected from a support base.

The one or more fault algorithms may include one or more pinch fault algorithms. The one or more pinch fault algorithms may function to detect the presence of one or more pinch conditions, stop and/or prevent rotation of a chamber, prevent execution of a cleaning cycle, or any combination thereof. The one or more pinch fault algorithms may be executed by one or more processors. One or more pinch fault algorithms may be executed upon receipt, change in, and/or absence of one or more pinch signals from one or more pinch detectors. The one or more pinch algorithms may instruct one or more processors to interpret one or more pinch signals received from one or more pinch detectors. The one or more pinch algorithms may instruct one or more processors to convert a pinch signal to a pinch status signal. The one or more fault algorithms may instruct one or more processors to apply one or more pinch rules. The one or more pinch rules may include stopping and/or preventing rotation of a chamber, preventing execution of one or more cleaning cycles, or both if one or more pinch signals, status signals, or both indicate the presence of a pinch condition with the litter device. One or more pinch rules may include instructing one or more processors to prevent rotation of one or more motors if a pinch signal, status signal, or both indicate the presence of a pinch signal. The one or more pinch rules may include instructing one or more processors to transmit the pinch signal, status signal, pinch fault, or a combination thereof to a user interface. A user may be able to refer to a graphic user interface (e.g., interface on litter device, interface of mobile computing device, etc.) to see a notification that a pinch condition is present, where the pinch condition is detected, or both. A user may receive a notification via a graphic user interface that a pinch condition is present.

The one or more fault algorithms may include one or more position fault algorithms. The one or more position fault algorithms may function to detect when a chamber is out of position, return a chamber into a proper position, return a chamber into a home position, stop and/or prevent rotation of a chamber, prevent execution of a cleaning cycle, or any combination thereof. Out of position may include a chamber not reaching or moving out of home position, an empty position, or both during one or more cleaning cycles. One or more suitable positions of a chamber are discussed in U.S. Pat. Nos. 8,757,094; and 9,433,185, which are incorporated herein. The one or more position algorithms may be executed by one or more processors. One or more position fault algorithms may be executed upon receipt, change in, and/or absence of one or more position signals from one or more position sensors. The one or more position fault algorithms may instruct one or more processors to interpret one or more position signals received from one or more position sensors. The one or more position fault algorithms may instruct one or more processors to convert a position signal to a position status signal. The one or more position fault algorithms may instruct one or more processors to apply one or more position rules. The one or more position rules may include stopping and/or preventing rotation of a chamber, preventing execution of one or more cleaning cycles, initiating rotation of a chamber to a home position, initiating rotation of a chamber to an empty position, restarting a cleaning cycle, or any combination thereof based on one or more position signals, status signals, or both indicating a chamber out of an intended position. One or more position rules may include instructing one or more processors to prevent rotation, initiate rotation, or both of one or more motors if a position signal, status signal, or both indicate a chamber is out of an intended position. The one or more position rules may include instructing one or more processors to transmit the position signal, status signal, position fault, or a combination thereof to a user interface. A user may be able to refer to a graphic user interface (e.g., interface on litter device, interface of mobile computing device, etc.) to see a notification that a position fault is present, in what position a chamber may be stuck in or prevented from moving into, or both. A user may receive a notification via a graphic user interface that a position fault is present.

The one or more fault algorithms may include one or more motor fault algorithms. The one or more motor fault algorithms may function to detect a motor is over torque, stalled, non-functional, over-heating, the like, or a combination thereof; stop and/or prevent rotation of a chamber, prevent execution of a cleaning cycle, or any combination thereof. The one or more motor fault algorithms may be executed by one or more processors. One or more motor fault algorithms may be executed upon receipt of one or more motor signals from one or more motor sensors. The one or more motor fault algorithms may instruct the one or more processors to interpret one or more motor signals received from one or more motor sensors. Interpreting a motor signal may include converting the motor signal to a motor status signal. Interpreting a motor signal may include comparing a motor status signal to one or more predetermined motor faults. The algorithm may include one or more predetermined motor faults stored therein. The one or more motor fault algorithms may instruct one or more processors to apply one or more motor rules. The one or more motor rules may include stopping and/or preventing rotation of a chamber, preventing execution of one or more cleaning cycles, or both. One or more motor rules may include stopping and/or preventing rotation of a chamber, preventing execution of one or more cleaning cycles, or both if one or more motor status signals match one or more predetermined motor faults. The one or more motor rules may include instructing one or more processors to transmit the motor signal, motor status signal, motor fault, or a combination thereof to a user interface. A user may be able to refer to a graphic user interface (e.g., interface on litter device, interface of mobile computing device, etc.) to see a notification of a motor fault. A user may receive a notification via a graphic user interface of the presence of a motor fault.

The one or more fault algorithms may include one or more power fault algorithms. The one or more power fault algorithms may function to notify a user that a litter device is not receiving a power supply, is offline (e.g., disconnected from a system and/or network), or both. The one or more power fault algorithms may be executed by one or more processors. The one or more processors may be located remote from the litter device, within the litter device, or both. A processor remote from the litter device may be advantageous in continuing to function when the litter device does not have power, is offline, or both. The one or more power fault algorithms may be executed upon the absence of one or more signals from one or more processors of a litter device. The one or more power fault algorithms may be executed upon the absence of any or all signals from one or more processors of a litter device. The one or more power fault algorithms may instruct one or more processors to transmit a power signal, power fault, or both to a user interface. A user may be able to refer to a graphic user interface (e.g., interface of a mobile computing device) to see a notification of a power fault. A user may receive a notification via a graphic user interface of the presence of a power fault.

One or more algorithms may include one or more instruction algorithms. The one or more instruction algorithms may function to relay one or more instruction signals from one or more computing devices to the litter device, change one or more conditions of a litter device based on one or more instruction signals, initiate one or more operations of the litter device, or any combination thereof. A user may provide one or more instruction signals via one or more user interfaces. A user interface may include an interface of the litter device, mobile computing device, non-mobile computing device, or any combination thereof. The use of one or more remotely located computing devices may be particularly advantageous for providing one or more instruction signals via a mobile computing device. Upon selection of one or more instruction signals via a user interface, one or more instruction algorithms may direct the one or more instruction signals to one or more processors. The one or more instruction algorithms may reside within one or more processors. The one or more instruction algorithms may be accessible and/or executable by one or more processors located remote from the litter device, within the litter device, or both. The one or more instruction algorithms may direct the one or more instruction signals to a processor located remote from the litter device and then to a processor (e.g., controller) located within the litter device. The one or more instruction algorithms may direct one or more processors to execute one or more operations of the litter device. One or more operations of a litter device may include one or more cleaning cycles, reset cycles, sleep modes, wait modes, light modes, lockout modes, training modes, power modes, reset modes, or any combination thereof. One or more instruction algorithms may include one or more cleaning cycle algorithms, reset cycle algorithms, sleep mode algorithms, wait mode algorithms, light mode algorithms, lockout mode algorithms, training mode algorithms, power mode algorithms, or any combination thereof.

One or more instruction algorithms may include one or more cleaning cycle algorithms. One or more cleaning cycle algorithms may function to initiate one or more cleaning cycles. One or more cleaning cycles may include a cleaning cycle as described in U.S. Pat. Nos. 8,757,094; and 9,433,185, which are incorporated herein. A user may select a cleaning cycle instruction via one or more user interfaces. Upon selection of a cleaning cycle instruction, one or more cleaning cycle algorithms may instruct one or more processors to identify the cleaning cycle instruction as a cleaning cycle instruction signal. The one or more cleaning cycle algorithms may instruct the one or more processors to direct the cleaning cycle instruction signal to a controller of the litter device. Upon starting a cleaning cycle, completing a cleaning cycle, or both a controller may send one or more signals to one or more processors of a status of the cleaning cycle. The one or more processors may relay the status of the cleaning cycle to one or more user interfaces. A status of a cleaning cycle may include confirming receipt of the cleaning cycle instruction by the controller of the litter device, initiating a cleaning cycle, progress of a cleaning cycle, completion of a cleaning cycle, or any combination thereof.

One or more instruction algorithms may include one or more sleep mode algorithms. One or more sleep mode algorithms may function to initiate one or more sleep modes. One or more sleep modes may prevent one or more cleaning cycles from occurring over a predetermined period of time. The predetermined period of time may include a start time, end time, duration of time, or any combination thereof. The one or more sleep modes may be particularly useful in preventing rotation of a chamber. Preventing rotation of a chamber may eliminate noise association with rotating a chamber, executing a cleaning cycle, or both. Eliminating noise may be particularly beneficial, such as when a user, infant within the same home as the device, and/or even one or more animals within the same home as the device, are sleeping or otherwise need a quiet environment. A user may select a sleep mode instruction via one or more user interfaces. Upon selection of a sleep mode instruction, one or more sleep mode algorithms may instruct one or more processors to direct the sleep mode instruction to one or more other processors. One or more other processors may include a processor within the system, a processor within a controller in the device, or both. Upon initiating one or more sleep modes, the one or more processors (such as the controller), may prevent rotation of the chamber, prevent execution of a cleaning cycle, or both for the predetermined period of time. Upon starting a sleep mode, in progress of a sleep mode, ending of a sleep mode, or any combination thereof, a controller may send one or more signals to one or more processors regarding a status of the sleep mode. The one or more processors may relay the status of the sleep mode to the one or more user interfaces. A status of the sleep mode may include confirming receipt of the sleep mode instruction, initiating a sleep mode, in progress of a sleep mode, ending a sleep mode, or any combination thereof.

One or more instruction algorithms may include one or more wait mode algorithms training mode algorithms, or both. One or more wait mode algorithms may function to initiate one or more wait modes. One or more training mode algorithms may function to initiate one or more training modes. One or more wait modes, training modes, or both may prevent one or more cleaning cycles from occurring for a predetermined period of time after waste is eliminated from an animal into the chamber, after the absence of an animal has been confirmed, or both; adjust the predetermined period of time; or any combination thereof. The predetermined period of time may include one or more time-intervals. The predetermined period of time may be selected by the user via a user interface. The predetermined period of time may be particularly advantageous for use with multi-animal households by allowing for more automatic and frequent cleaning of the device; an animal suffering one or more ailments requiring frequent use of the litter device for eliminating waste by allowing for more time between cleaning cycles; or both. The predetermined period of time may also be useful while acclimating an animal to the litter device, training an animal under the predetermined mass to use the litter device, or both. A user may select a wait mode instruction via one or more user interfaces. Upon selection of a wait mode instruction, training mode instruction, or both one or more wait mode algorithms, training mode algorithms, or both may instruct one or more processors to direct the wait mode instruction, training mode instruction, or both to one or more other processors. One or more processors may include a processor within the system, within a controller of the device, or both. Upon initiating the one or more wait modes, training modes, or both the one or more processors may edit a predetermined wait period within an onboard wait mode algorithm to the predetermined period selected by the user. Upon initiating one or more wait modes, training modes, or both, one or more processors may wait the predetermined period of time after a mass of the device has substantially returned to a baseline mass before initiating a clean cycle. The edited, predetermined period of time may reside within one or more computing devices, storage mediums, algorithms, or any combination thereof located directly within the litter device. The edited, predetermined period of time may reside within a controller of the litter device. The one or more processors may relay the status of the wait mode, training mode, or both to the one or more user interfaces. A status of the wait mode, training mode, or both may include confirming receipt of the wait mode instruction, training instruction, or both; initiating of a new or edited predetermined period of time; the currently selected predetermined period of time; or any combination thereof.

One or more instruction algorithms may include one or more light mode algorithms. One or more light mode algorithms may function to initiate one or more light modes. One or more light modes may include one or more lights of the litter device being powered on, powered off, or both. A user may select a light mode instruction via one or more user interfaces. Upon selection of a light mode instruction, one or more light mode algorithms may instruct one or more processors to identify the light mode instruction as a light mode instruction signal. The one or more light mode algorithms may instruct one or more processors to direct the light mode instruction signal to a controller of the litter device. Upon starting a light mode, powering on one or more lights, powering off one or more lights; or any combination thereof the one or more algorithms may instruct one or more processors to send one or more signals related to a status of the light mode to one or more other processors, a user interface, or both. A status of a light mode may include confirming receipt of the light mode algorithm, the mode of one of more lights (e.g., power on, power off, or both), or a combination thereof.

One or more instruction algorithms may include one or more lockout mode algorithms. One or more lockout mode algorithms may function to initiate one or more lockout modes. One or more lockout modes may include panel accessible, panel locked out, or both. Panel accessible may mean that a user interface located on the litter device may be operable to change one or more settings (e.g., algorithms) stored within the device, the system, or both. Panel locked out may mean that a user interface located on the litter device is temporarily disconnected from one or more processors, such one or more controllers, such that any inputs do not have an impact on any settings (e.g., algorithms). A user may select one or more lockout mode instructions via a user interface remote from and/or affixed to the litter device. The one or more lockout mode algorithms may instruct one or more processors to direct a lockout mode instruction signal to a controller of the litter device. The one or more lockout modes algorithms may instruct one or more controllers of the device to allow receipt of user inputs via a user interface on the device (e.g., accessible), prevent receipt of user inputs via a user interface on the device (e.g., locked out), or both. Upon starting a lockout mode, one or more algorithms may instruct one or more processors to send one or more signals related to a status of the lockout mode to one or more other processors, user interfaces, or both. A status of a lockout mode may include confirming receipt of the lock mode instruction, the actual lockout mode of the litter device, or both.

One or more instruction algorithms may include one or more power mode algorithms. One or more power mode algorithm may function to initiate one or more power modes. One or more power modes may include the litter device being powered on, powered off, placed into hibernation mode, connected to a system and/or network, disconnected from a system and/or network, or any combination thereof. A user may select one or more power mode instructions via a user interface remote from and/or affixed to the litter device. The one or more power mode algorithms may instruct one or more processors to direct a power mode instruction signal to a controller of the litter device. The one or more power mode algorithms may instruct one or more controllers of the device to power the device on or off, place the device into a hibernation mode, connect the device to a network and/or system; disconnect the device from a network and/or system; or any combination thereof. Upon starting a power mode, one or more power mode algorithms may instruct one or more processors to send one or more signals related to a status of the power mode to one or more other processors, user interfaces, or both. A status of a power mode may include confirming receipt of a power mode instruction, initiating of a change in power mode, completing a change in a power mode, a real-time power mode of the litter device, or any combination thereof.

ILLUSTRATIVE EMBODIMENT(S)

FIG. 1 illustrates a system 10 for operating an automated litter device 12. The litter device 12 includes a chamber 14 and a waste drawer 16. The litter device 12 also includes a controller 18 and a communication module 20. The controller 18 and communication module 20 may be located internally within the litter device 12, such as within a base 15. The system 10 further includes a user interface 22. The user interface 22 is part of a graphic user interface of a mobile computing device 24. A user interface 22 may also be incorporated into the litter device 12. The system 10 may include one or more communication hubs 21. The communication hubs 21 may include a router 25 and antenna tower 23. The system 10 may incorporate a network 19, such as the Internet. The system 10 further includes an interaction interface 26. The interaction interface 26 is in the form of an application programming interface (API) 27. The communication module 20 is able to communicate with the interaction interface 26 through the user interface 22 or via a dispatch interface 28. The dispatch interface 28 is in communication with the interaction interface 26 and the communication module 20. The interaction interface 26 is also in communication with an authentication portal 30.

FIG. 1 may present a working example of how the system 10 may allow for the automated litter device 12 to communicate with a user interface 22 and vice-versa. The mobile computing device 24 may connect with the automated litter device 12 directly and wirelessly or indirectly. A direct and wireless connection between the mobile computing device 24 and the litter device 12 may be established using User Datagram Protocol (UDP) and/or Bluetooth Low Energy (BLE) protocol. This type of direct and wireless connection may be useful when first setting up and onboarding the automated litter device 12 into an overall network, such as the system 10 of FIG. 1. The mobile computing device 24 may then be in wireless communication with the Internet 19 either via a router 25 or an antenna tower 23. The automated litter device 12 may be in wireless communication with the Internet 19 via a router 25. Although it is shown that the mobile computing device 24 and the litter device 12 are sharing the router 25, they may each connect to the Internet 19 via separate routers 25, such as when the mobile computing device 24 is in a different facility than the litter device 12. The litter device 12 may be in wireless communication with the dispatch interface 28 using user datagram protocol (UDP), message queueing telemetry transport (MQTT) protocol, or both, such as over the Internet 19. The mobile computing device 24 may be in wireless communication to the interaction interface 26 over the Internet 19. The mobile computing device 24 may be in communication with the interaction interface 26 using a representation state transfer protocol (REST). The interaction interface 26 may also use REST protocol to communicate with the dispatch interface 28. The interaction interface 26 may additionally be in communication with an authentication portal 30. The interaction interface 26 may use simple object access protocol (SOAP) to communicate with the authentication portal 30.

Figure 2:
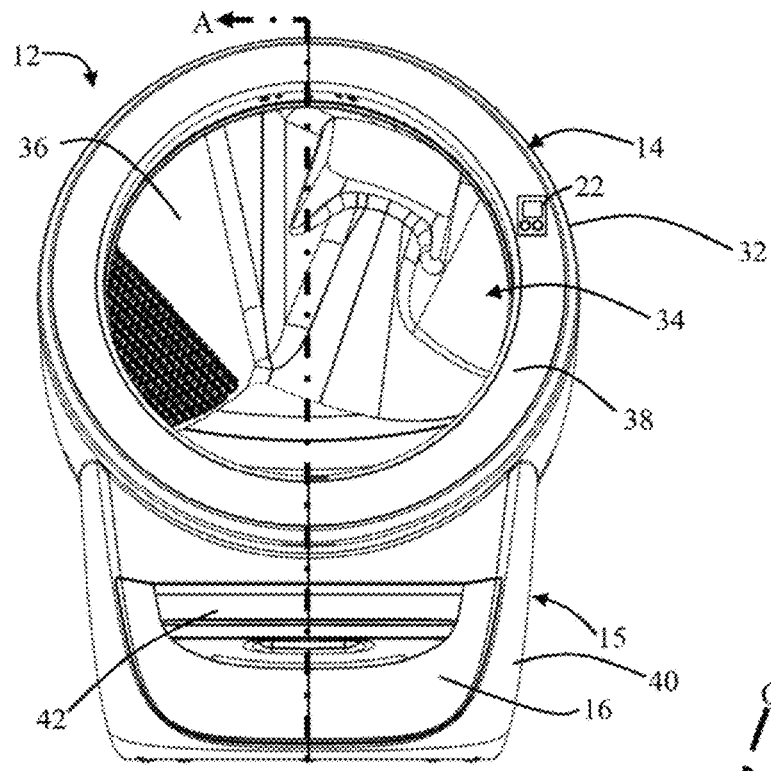
FIG. 2 illustrates a front view of an automated litter device, according to the teachings herein.

FIG. 2 illustrates an automatic litter device 12. The litter device 12 includes a chamber 14. A bonnet 32 is located around a portion of the chamber 14. An opening 34 is formed in the chamber 14. Inside the chamber 14 is a septum 36. A bezel 38 surrounds the opening 22. The bezel 38 includes a user interface 22. The bezel 38 is affixed to the base 15. The base includes a base frame 40. Located within and removable from the base frame 40 is a waste drawer 16. The waste drawer 16 includes a step 42.

Figure 3:
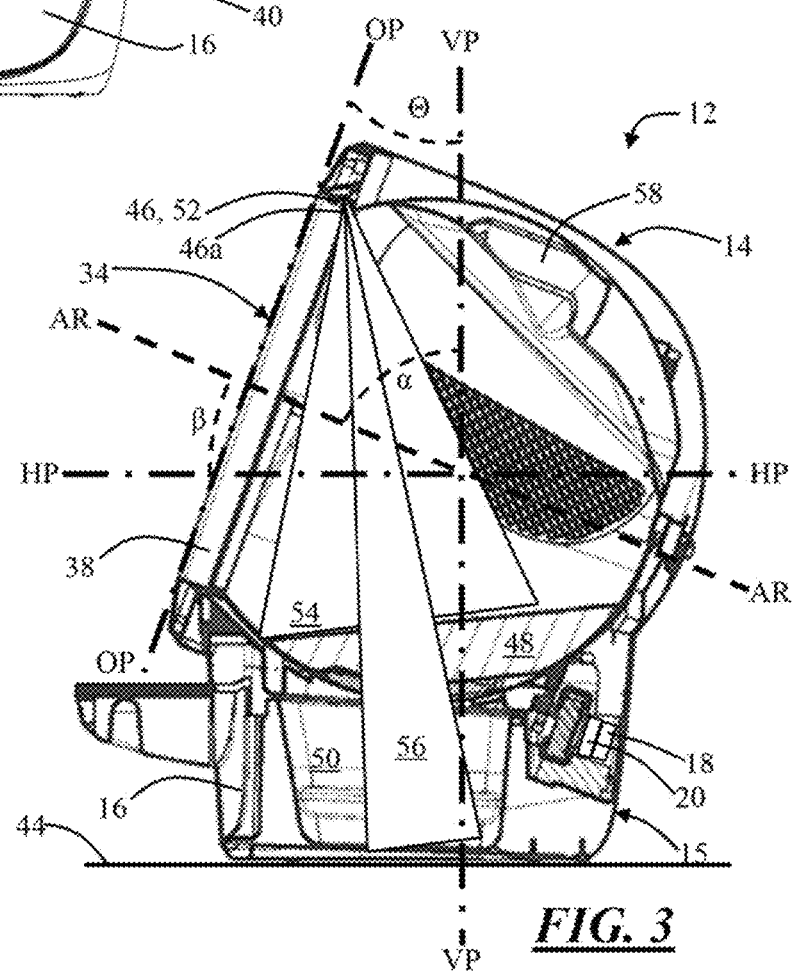
FIG. 3 illustrates a cross-section of an automated litter device along section A-A of FIG. 2, according to the teachings herein.

FIG. 3 illustrates a sensing range within an automatic litter device 12. The device 12 includes a chamber 14 supported by a base 15. The chamber 14 includes an axis of rotation AR. During a cleaning cycle, the chamber 14 rotates about the axis of rotation AR. During the cleaning cycle, a waste opening 58 of the chamber 14 aligns with a bin interior 50 of the waste drawer 16 to allow waste to transfer from within an interior of the chamber 14 into a bin interior 50 of the waste drawer 16. The chamber 14 is tilted such that the axis of rotation AR is not parallel to a rest surface 82 upon which the litter device 12 rests on. The axis of rotation AR forms an angle α with vertical which is represented by a vertical plane VP. The axis of rotation AR forms an angle β with a horizontal plane HP substantially parallel to a surface 44. The opening 34 extends along an opening plane OP. The opening plane OP forms an angle Θ with the vertical plane VP.

The litter device 12 includes one or more sensors 46. Due to the tilt of the chamber 14, one or more sensors 46 affixed to the bezel 38 at the opening 34 are able to sense one or more conditions within the litter device 12. Specifically, due to the tilt of the chamber 14, the one or more sensors 46 are aligned with litter 5 (within the chamber 14) and a bin interior 50 of a waste drawer 16. The one or more sensors 46 may be one or more laser sensors 52. The one or more laser sensors 52 may include one or more cone lasers. For example, two wide cone lasers and a one narrow cone laser may be used together. The one or more sensors 52 may be able to measure a distance, displacement, and/or even position within the chamber 12, within the bin interior 50 of a waste drawer 16, or both. One or more of the sensors 46 have an animal presence sensing range 54. The animal presence sensing range 54 covers a majority of an upper surface of the litter 48 within the chamber. One or more of the sensors 46 which provide the animal presence sensing range 104 are able to sense or detect the presence of an animal within the chamber 14. The one or more sensors 46 which provide the animal presence sensing range 54 may be one or more cone laser sensors, such as two wide cone laser sensors or even the combination of two wide cone laser sensors and one narrow cone laser sensor. The one or more sensors 46 have a waste level sensing range 56. Those sensors 46 associated with the waste level sensing range 56 may be referred to as waste drawer sensors 46a. The waste level sensing range 56 is able to cover a surface area within a bin interior 50 of a waste drawer 16. The one or more sensors 46 which provide the waste level sensing range 56 have the "line of sight" aligned with the bin interior 50 when a waste opening 58 is rotated during a cleaning cycle such that the waste opening 58 exposes the bin interior 50. This line of sight alignment is a result of the tilt of the chamber 14 relative to the vertical plane VP. If the chamber 14 were to have its axis of rotation AR aligned with horizontal plane HP, the sensors 46 would have a sensing range looking across the opening 34 as opposed to into the chamber 14. The one or more sensors 46 which provide the waste level sensing range 56 may include a single narrow cone laser sensor. In addition to sensing the presence of an animal within the chamber 14, waste or a waste level within the bin interior 50, the one or more sensors 52 may also provide position sensing of the chamber 14 before, during, and/or after a cleaning cycle.

Figure 4:
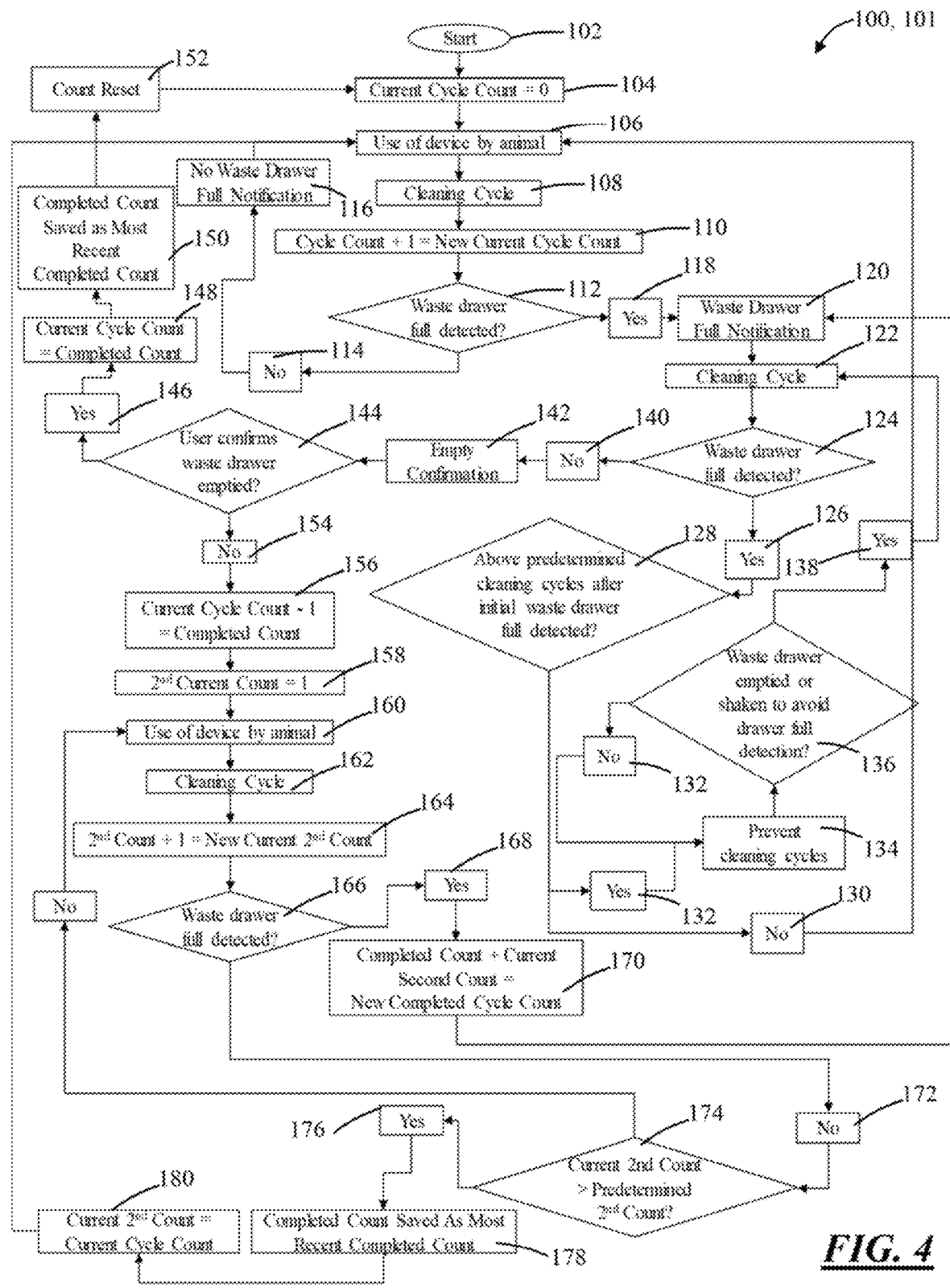
FIG. 4 illustrates a process of executing one or more waste drawer algorithms of a litter device to calculate a clean cycle count, according to the teachings herein.

The base 15 also includes both the controller 18 and communication module 20. As an alternative, the controller 18 and/or the communication module 20 could also be located on the chamber 14 or part of the bezel 38. Such as in the same or proximate to the one or more sensors 46. FIG. 4 illustrates a clean cycle count process 100. During the clean cycle count process 100, one or more waste drawer algorithms 101 of a litter device 12 (not shown) are executed to calculate a clean cycle count. The process 100 starts 102 with a current clean cycle count set at zero 104. The clean cycle count is set at zero 104 as a waste drawer 16 (not shown) of the litter device 12 (not shown) has not yet been used or has just been emptied. An animal enters a chamber 14 (not shown) of the litter device 12 (not shown) and excretes waste, then exits the chamber 106. Upon exiting the chamber 14 (not shown), a cleaning cycle of the litter device 12 (not shown) is initiated 108 such that the waste is transferred from the chamber 14 (not shown) to the waste drawer 16 (not shown). After a cleaning cycle occurs 108, the current clean cycle count is aggregated by one to calculate an updated current clean cycle count 110. One or more waste drawer sensors 46a (not shown) monitor a level of waste 112 within the waste drawer 16 (not shown). If the one or more waste drawer sensors 46a (not shown) do not detect the waste drawer is full 114, there is no notification 116 provided to a user via a user interface 24 (not shown) that the waste drawer 16 (not shown) is full. If one or more waste drawer sensors 46a do not detect the waste drawer 16 (not shown) being full, the litter device 12 (not shown) is able to continue to be used by an animal (e.g., back to step 106) and the clean cycle count increases by one for each cleaning cycle executed (e.g., back to steps 108, 110, and 112). If one or more waste drawer sensors 46a (not shown) detect the waste drawer 16 (not shown) is full 118, a notification is provided 120 via a user interface 24 (not shown) indicating the waste drawer 16 (not shown) is getting full, almost full, or even full of waste.

After the waste drawer full notification is provided 120, the one or more waste drawer algorithms of the clean cycle count process 100 awaits the next cleaning cycle 122. After a subsequent cleaning cycle 122, the waste drawer algorithm determines if one or more waste drawer sensors 46a (not shown) still detect 124 a waste drawer 16 (not shown) being full or if the one or more waste drawer sensors 46a (not shown) no longer sense a getting full, almost full, or even full amount of waste within the waste drawer 16 (not shown). If the one or more waste drawer sensors continue to detect the waste drawer is full 126, the waste drawer algorithm then seeks to determine if a certain number of pre-determined cleaning cycles have occurred after the one or more waste drawer sensors 46a (not shown) initially sensed the waste drawer 16 (not shown) as being full 128. If the number of cleaning cycles is below the number of pre-determined cleaning cycles 130, the litter device 12 (not shown) is able to continue to be used by an animal (e.g., back to 106), cleaning cycle continues to occur (e.g., repeat 108), and the cleaning cycle may continue to increase by one per cleaning cycle executed (e.g., repeat 110, 112). If the number of cleaning cycles is at or above the pre-determined cleaning cycles 132, a cleaning cycle of the litter device 12 (not shown) is prevented 134. Cleaning cycles of the litter device continue to be prevented until the waste drawer is emptied 136. Once the waste drawer 16 (not shown) is emptied 138, a cleaning cycle is allowed to occur 122 and the one or more waste drawer algorithms sense the occurrence of the cleaning cycle 122 and the absence of the waste drawer sensors 46a (not shown) sensing the waste drawer 16 (not shown)being full 124, 126.

Typically, there are two circumstances when after a waste drawer full notification 120 and a cleaning cycle 122 occurs, the waste drawer full condition is no longer detected 140. These two conditions include: 1) a user emptying the waste drawer 16 (not shown), or 2) the user moving waste contents within a waste drawer 16 (not shown) such that the one or more waste drawer sensors 46a (not shown) no longer sense the waste drawer 16 (not shown) being full.

After a cleaning cycle is sensed 122 and one or more waste drawer sensors 46a (not shown) no longer sense the waste drawer 16 (not shown) being full, an empty confirmation 142 is displayed on a reset interface 22. The reset interface 22 may be part of one or more user interfaces 22 (not shown). The reset interface 22 requests a user input confirming if the waste drawer 16 (not shown) has been emptied. A user may affirmatively respond that a waste drawer 16 (not shown) has been emptied 146. When a user affirmatively responds the waste drawer 16 (not shown) has been emptied 146, the one or more waste drawer algorithms convert the current clean cycle count into a completed clean cycle count 148. The completed clean cycle count is then stored within one or more storage mediums as the most recent completed clean cycle count data entry 150. Once the completed clean cycle count is stored 150, the current clean cycle count is reset to zero 152.

A user may not respond via the reset interface 22 (not shown), such as by ignoring the empty confirmation 154. If a user does not respond to the empty confirmation 154, the current clean cycle count is temporarily stored as a completed clean cycle count data entry 156. A second current clean cycle count begins at one 158. As the litter device 12 (not shown) is used by an animal 160 and a cleaning cycle occurs 162, the second current clean cycle is increased by one to create an updated second clean cycle count 164. Once one or more waste drawer sensors 46a (not shown) sense 166 the waste drawer 16 (not shown) is partially full, getting full, or is full 168, the one or more waste drawer algorithms may aggregate the completed clean cycle count data entry with the current second clean cycle count to calculate a new, current cycle count 170. Additionally, once a new, current cycle count is calculated 170, one or more waste drawer full notifications are provided (e.g., back to 120). As long as the one or more waste drawer sensors 46a (not shown) do not sense the waste drawer 16 (not shown) being full 172, an animal is able to continue using (e.g., back to 160) the litter device 12 (not shown), cleaning cycles continue to occur 162, and the second clean cycle count continues to be updated 164 until the second clean cycle count 174 reaches a predetermined second clean cycle count maximum 176. Upon reaching a predetermined second clean cycle count maximum 174 without one or more waste drawer sensors 46a (not shown) detecting the waste drawer 16 (not shown) is full, the initial (e.g., temporarily stored) completed cleaning cycle count is stored as the most recent completed clean cycle count data entry 178. The current, second clean cycle count is then converted into the new, completed clean cycle count 180. Cleaning cycles (e.g., back to 108) are allowed to continue to occur after use of the litter device by an animal (e.g., back to 106).

Figure 5:
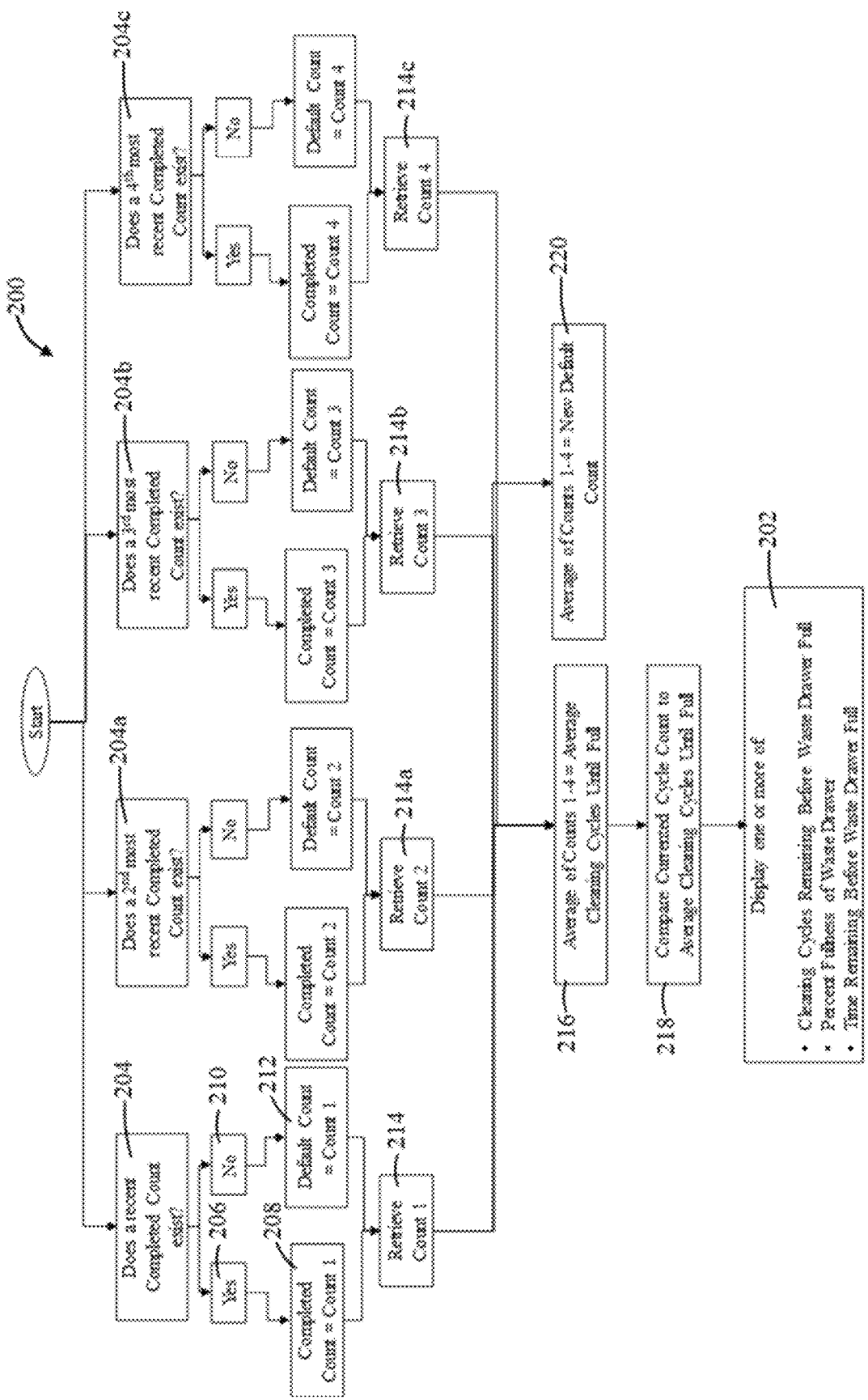
FIG. 5 illustrates a process of executing one or more waste drawer status algorithms to determine a waste drawer status, according to the teachings herein.

FIG. 5 illustrates a process of executing one or more waste drawer status algorithms 200 to determine a waste drawer status 202. The one or more waste drawer status algorithms 200 first identify if there is a recent completed clean cycle data entry 204 (e.g, stored within a storage medium). If there is 206, the one or more waste drawer status algorithms 200 retrieve the entry 208 as the first clean cycle count 214. If there is not a recent completed clean cycle data entry 210, the one or more waste drawer status algorithms 200 retrieve a default, pre-determined clean cycle count 212 as the first clean cycle count 214. The one or more waste drawer status algorithms similarly, look for a second 204a, third 204b, fourth 204c (and so on) most recent completed clean cycle data entry to retrieve the second, third, fourth (and so on) clean cycle counts 214a, 214b, 214c. Although the example provides for four most recent completed clean cycle data entries, this is only exemplary. The one or more waste drawer status algorithms 200 then automatically calculate the average cleaning cycle counts to determine an average cleaning-cycles-until-full 216. The one or more waste drawer status algorithms 200 then compare a current clean cycle count (such that displayed in FIG. 4) to the average cleaning-cycles-until-full 218. By comparing, the one or more waste drawer status algorithms 200 automatically calculate and estimate a waste drawer status 202. The waste drawer status 202 may include one or more of the following: cleaning cycles remaining before waste drawer is full, a percentage of fullness of a waste drawer, a time remaining before the waste drawer is full, the like, or a combination thereof. Additionally, the new, calculated average of cleaning cycles until full 216 may become the new pre-determined cycle count 220.

Figure 6:
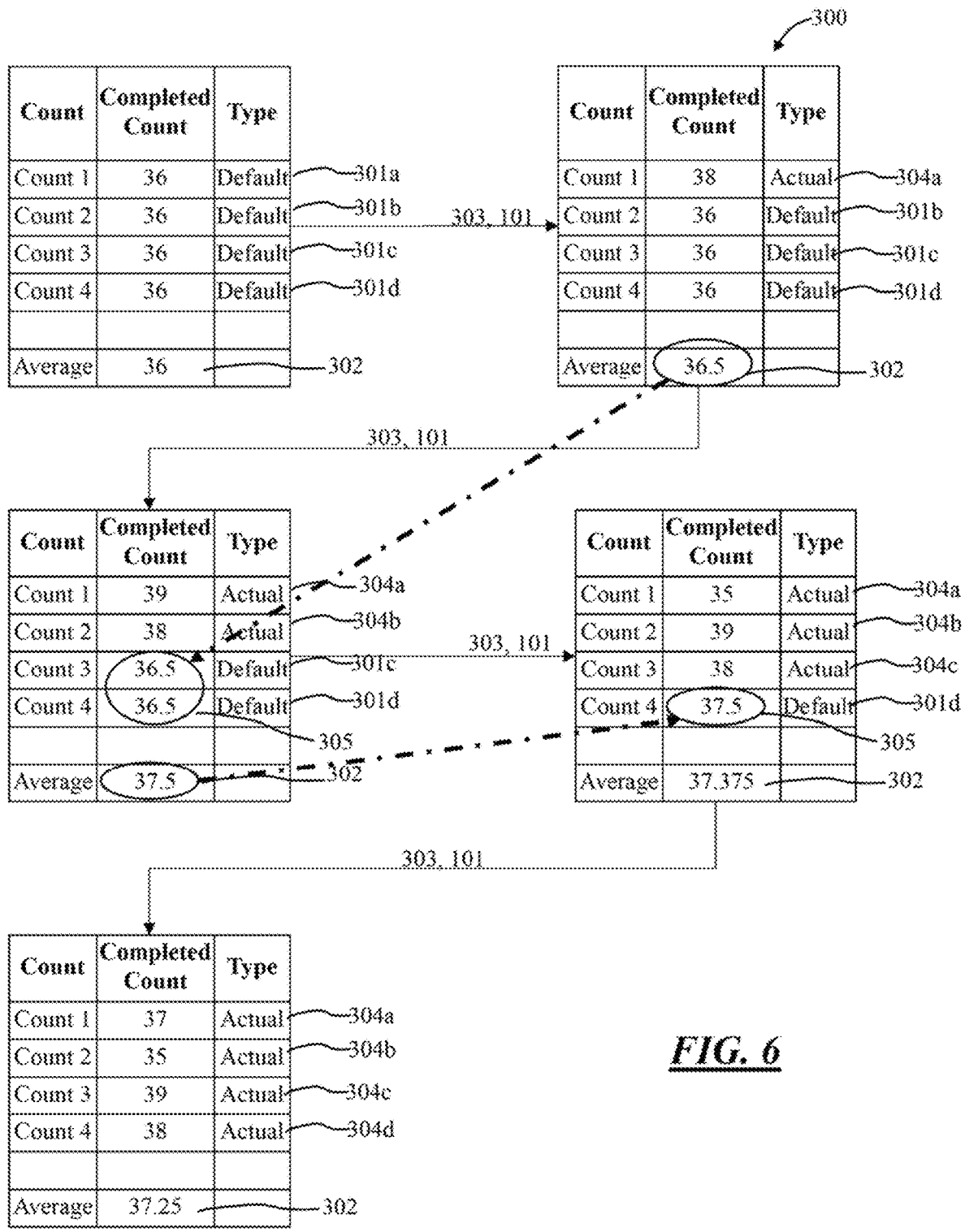
FIG. 6 illustrates a process of updating a moving average of a completed or default count according to the teachings herein.

FIG. 6 illustrates a process of calculating an average cleaning-cycles-until-full and updating the default, pre-determined cycle count 300. When the litter device 12 (not shown) has not yet been used or has not yet been full, the waste drawer status algorithms 101 (such as illustrated in FIG. 4) may use a default, predetermined cycle count 301a-d to calculate an average cleaning cycles until full 302. As illustrated in the example, 36 cleaning cycles are assumed. In other words, it is initially estimated that the waste drawer 16 (not shown) will reach a full level of waste when 36 cleaning cycles have occurred. After the waste drawer has reached full status for the first time and been emptied 303 (such as shown in FIG. 4), the one or more waste drawer algorithms 101 may replace a count 301*a* with the actual count of completed cycles until the waste drawer reaches a full level 304*a*. As can be seen, Count 1 is converted to the actual number of completed cycles. The average of Counts 1 to 4 is calculated (such as shown in FIG. 5) and the average becomes the new default, pre-determined cycle count 302. The average may be rounded up or down to the nearest whole number (not shown). The average 302 also becomes the new average cleaning-cycles-until-full 305 and thus default, predetermined cycle count 301*c-d*. The process is repeated after each time a waste drawer is full and then emptied (as shown in FIG. 4), until all of the counts represent actual cleaning-cycles-until-full 304*a-d*, as opposed to requiring a default, pre-determined cycle count 301*a-d*, 305. In this example, there are four counts which initially use the default, pre-determined cycle count. Thus, after have a waste drawer full status detected and emptying the waste drawer four times, all of the counts represent the actual number of cleaning-cycles-until-full 304*a-d* and no longer require the use of the default, pre-determined cycle count 301*a-d*, 305.

Figures 7, 8:
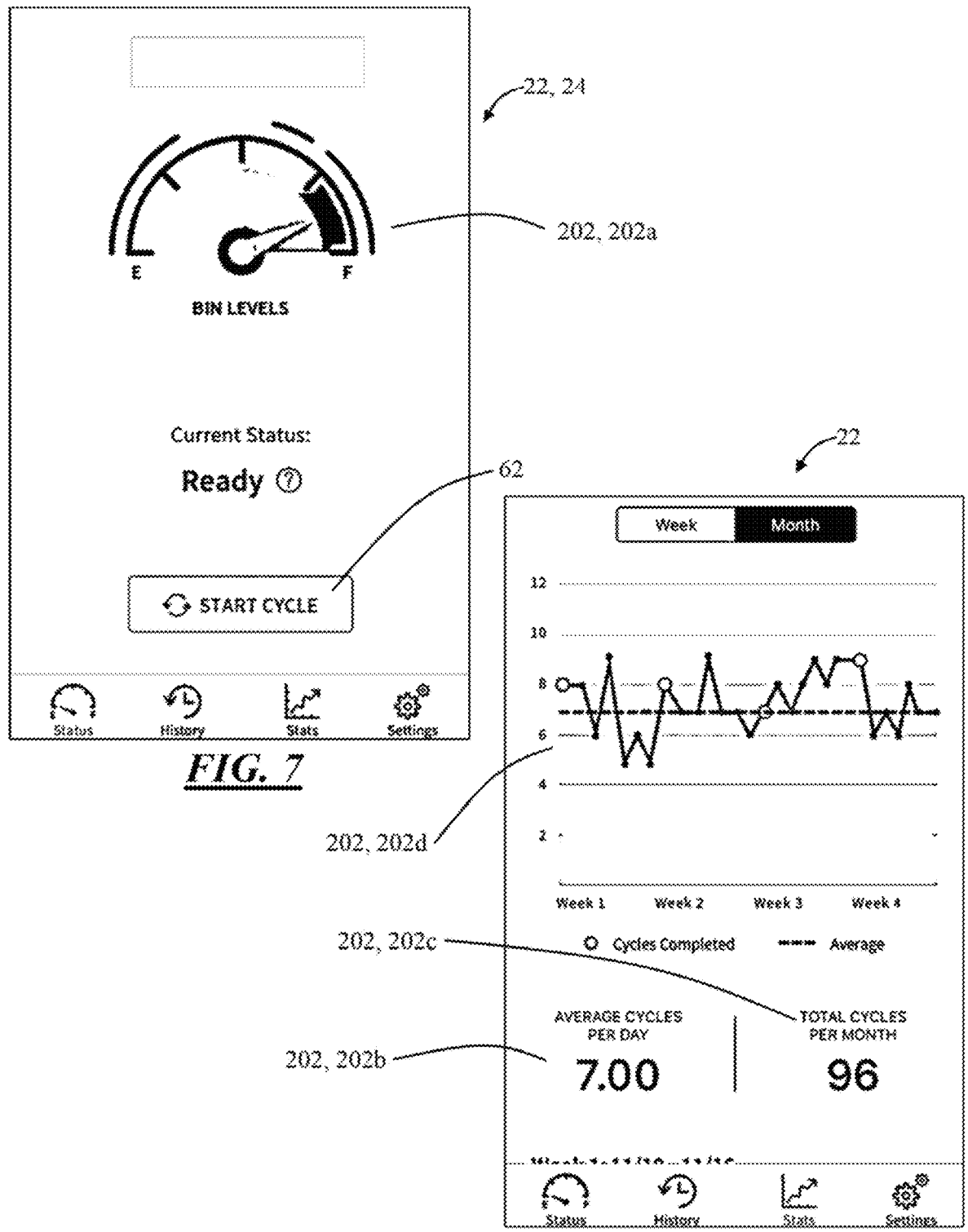
FIG. 7 illustrates a user interface showing a waste drawer status according to the teachings herein.
FIG. 8 illustrates a user interface showing a waste drawer status according to the teachings herein.

FIG. 7 illustrates a user interface 22, such as that of a mobile computing device 24. The user interface 22 includes displays a waste drawer status 202. The waste drawer status 202 as displayed is a level of fullness of a waste drawer (e.g., bin) 202*a*. The user interface 22 also includes an instruction button 60. The instruction button 60 is specifically a cleaning cycle instruction button 62. The cleaning cycle instruction button 62 allows for a user to initiate a cleaning cycle of the device 12 (not shown).

FIG. 8 illustrates a user interface 22. The user interface 22 displays a waste drawer status 202. The waste drawer status 202 as displayed is an average number of cleaning cycles per day 202*b* of the automated litter device 12 (not shown), the total cleaning cycles per month 202*c* of the automated litter device 12 (not shown), and an overall chart showing the cleaning cycles over a month time period 202*d*. Although a month is shown, the time period may be shown in weeks, days, years, and the like.

Figures 9, 10:
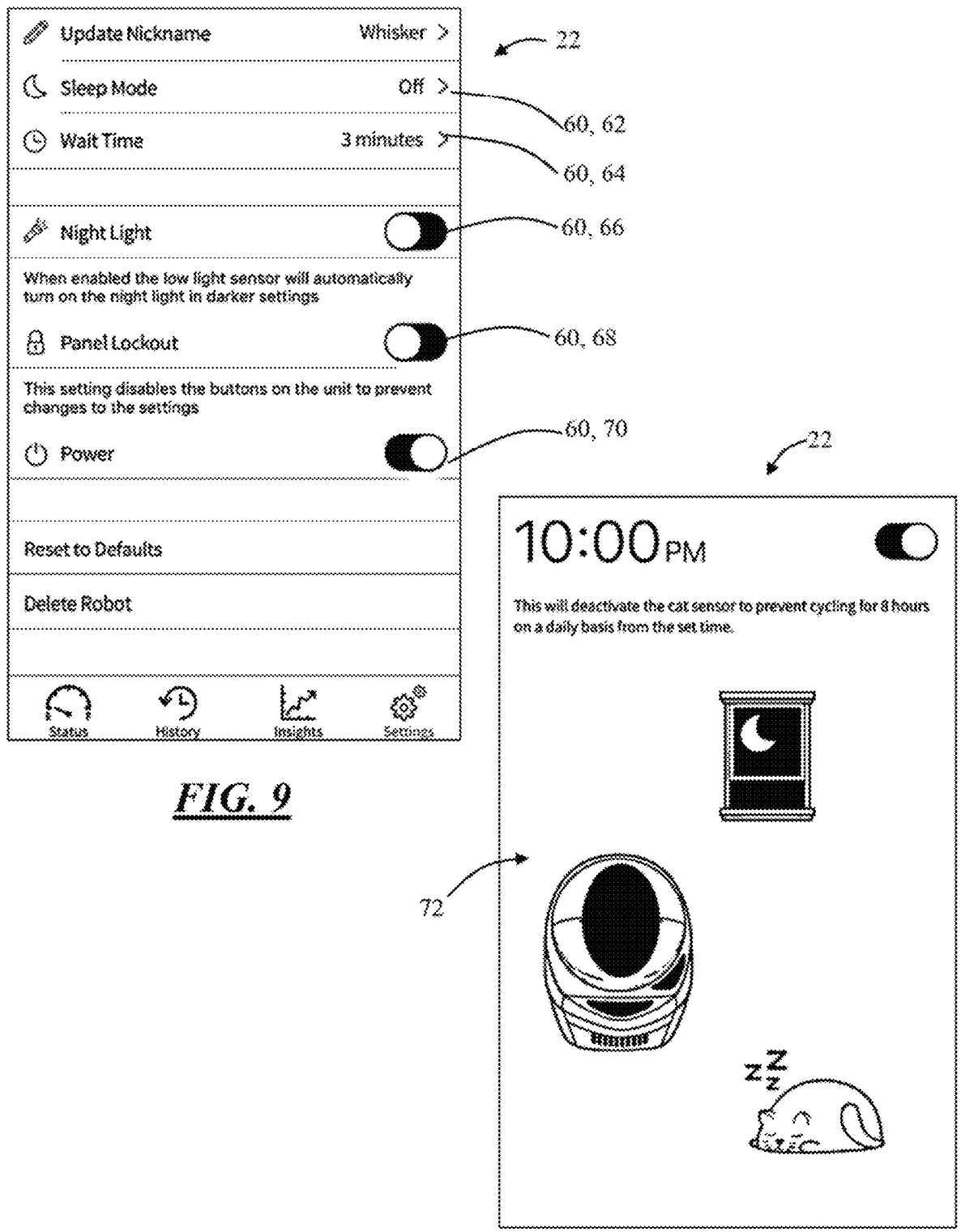
FIG. 9 illustrates a user interface showing an input screen for one or more instructions by a user according to the teachings herein.
FIG. 10 illustrates a user interface showing a view for sleep mode instruction by a user according to the teachings herein.

FIG. 9 illustrates a user interface 22. The user interface 22 displays a plurality of instruction buttons 60. The instructions buttons 60 include a sleep mode menu button 62, a wait time menu button 64, a light button 66, a lockout button 68, and a power button 70. The plurality of instruction buttons 60 may each allow for causing of one or more operations of the automated litter device 12. Upon selecting an instruction button 60, one or more instruction algorithms may be executed to change the one or more operations or conditions of the device 12. The sleep mode menu button 62 may allow for entering or exiting a sleep mode of the device 12. The wait time menu button 64 may allow for setting of a wait time for wait mode of the device 12. The light button 66 may allow for changing a light mode of the device 12. The lockout button 68 may allow for enabling or disabling a lockout mode of the device 12. The power button 70 may allow for changing the power mode of the device 12.

FIG. 10 illustrates a user interface 22. The user interface 22 is within a sleep menu 72. The sleep menu 72 may be accessed by a sleep menu button 64 such as illustrated in FIG. 9. The sleep menu 72 allows for a user to configure one or more sleep modes of a remotely located automated litter device 12 (such as shown in FIG. 2).

Figure 11:
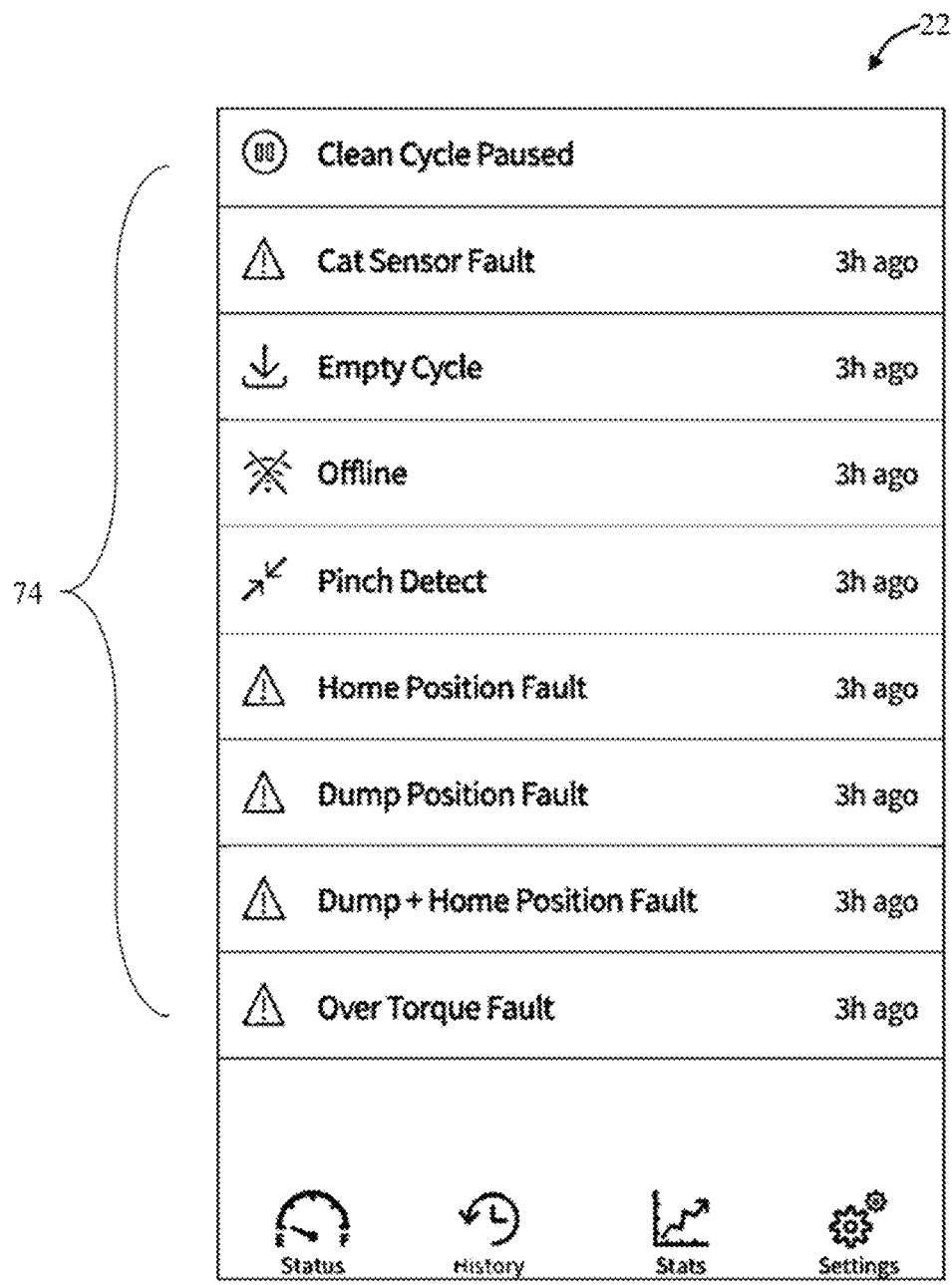
FIG. 11 illustrates a user interface showing a plurality of conditions according to the teachings herein.

FIG. 11 illustrates a user interface 22. The user interface 22 displays one or more conditions 74 of a remotely located automated litter device 12 (such as shown in FIG. 2). The one or more conditions 74 can include a pinch condition 76

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A device which is an automated litter device comprising:
   a) a chamber configured to hold litter to allow an animal to enter and excrete a waste;
   b) a waste drawer in communication with the chamber and configured to receive the waste;
   c) one or more sensors configured to detect one or more conditions of the device and transmit one or more signals related to the one or more conditions;
   d) a controller in communication with the one or more sensors and is adapted to receive the one or more signals, wherein the controller is configured to determine one or more positions of the chamber based on the one or more signals received from the one or more sensors and interpret the one or more signals as one or more status signals;
   e) a communication module in communication with the controller and adapted to communicate with a user interface via a network to transmit the one or more status signals to the user interface, receive one or more instruction signals via the user interface, or both;

wherein the communication module is a wireless communication module and is in wireless communication with the user interface via the network; and wherein the user interface is adapted to transmit the one or more instruction signals wirelessly to the controller via the network to change at least one of the one or more conditions of the device.

2. The device of claim 1, wherein the user interface is a mobile computing device, a non-mobile computing device, or both.

3. The device of claim 2, wherein the mobile computing device includes a mobile phone, a tablet, a mobile computer, or a combination thereof; and wherein the non-mobile computing device includes a desktop computer.

4. The device of claim 1, wherein the wireless communication module comprises a Wi-Fi transmitter, a Bluetooth transmitter, an infrared transmitter, a radio frequency transmitter, an IEEE 802.15.4 compliant transmitter, or any combination thereof.

5. The device of claim 4, wherein the user interface is configured to allow a user to instruct the device to perform one or more operations resulting in the one or more instruction signals being transmitted to the controller via the communication module and the controller is configured to initiate the one or more operations of the device;

wherein the one or more operations include: one or more cleaning cycles, one or more reset cycles, one or more sleep modes, one or more wait modes, one or more light modes, one or more lockout modes, one or more training modes, one or more power modes, or a combination thereof.

6. The device of claim 4, wherein the communication module is configured to communicate with the user interface via an interaction interface through the network;

wherein the interaction interface is an application programming interface (API); and wherein the network is an Internet.

7. The device of claim 4, wherein the one or more sensors include one or more waste drawer sensors and the one or more signals include one or more waste level signals from the one or more waste drawer sensors to the controller;

wherein the controller is adapted to relay a level of the waste within the waste drawer to the user interface via the communication module; and wherein the level of the waste includes any level from empty to a maximum level of fullness of the waste drawer; a pre-determined level of the waste near a maximum capacity of the waste drawer; a pre-determined level of the waste at the maximum capacity of the waste drawer; or a combination thereof; and wherein the level of the waste is displayed in real-time on the user interface.

8. The device of claim 7, wherein a waste drawer algorithm is configured to calculate how many cleaning cycles of the device remain before the waste drawer reaches the maximum capacity; and wherein a cleaning cycle of the device is rotational movement of the chamber such that a waste opening of the chamber aligns with the waste drawer and the waste located within the chamber transfers from the chamber to the waste drawer.

9. The device of claim 8, wherein the waste drawer algorithm is stored within one or more non-transient storage mediums and accessible by one or more processors;

and the one or more non-transient storage mediums and the one or more processors are part of the controller as part of the device, are located remote from the device and in communication via the network, or both.

10. The device of claim 9, wherein the waste drawer algorithm is an algorithm which calculates and averages how many of the cleaning cycles occur between two or more waste drawer full signals, resets a clean cycle count and a waste drawer full signal, or both.

11. The device of claim 9, wherein the one or more processors wirelessly communicate to the user interface via the network how many of the cleaning cycles remain before the waste drawer is full at the maximum capacity, a percentage of a fullness of the waste drawer relative to the maximum capacity, an estimated time duration until a user needs to empty the waste drawer before the waste drawer reaches the maximum capacity, if subsequent cleaning cycles are prevented due to the waste drawer being full at the maximum capacity, or any combination thereof.

12. The device of claim 1, wherein the one or more sensors include one or more waste drawer sensors, one or more mass or presence sensors, one or more light sensors, one or more interlock sensors, one or more pinch detectors, one or more position sensors, one or more motor sensors, or any combination thereof; and wherein the one or more signals include a waste level signal from the one or more waste drawer sensors, a mass signal or a presence signal from the one or more mass or presence sensors, a light level signal from the one or more light sensors, an interlock signal from the one or more interlock sensors, a pinch signal from the one or more pinch detectors, a position signal from the one or more position sensors, a motor signal from the one or more motor sensors, or any combination thereof.

13. A method of operating an automated litter device via a user interface remote from the automated litter device comprising the steps of:

a) receiving an input from a user via the user interface to change one or more conditions of the automated litter device, wherein the user interface is located remote from the automated litter device and in wireless communication with a communication module of the automated litter device over a network, and wherein the input includes one or more instructions which instruct the automated litter device to perform one or more operations;

b) sending the one or more instructions to the communication module, wherein the communication module is a wireless communication module, is in communication with a controller, and wherein both the communication module and the controller are part of the automated litter device;

c) sending one or more instruction signals associated with the one or more instructions from the communication module to the controller, wherein the controller includes one or more processors for analyzing the one or more instruction signals;

d) automatically initiating the one or more operations of the automated litter device by the one or more processors of the controller based on the one or more instruction signals to change the one or more conditions of the automated litter device;

wherein the automated litter device includes a chamber configured to hold litter to allow an animal to enter and excrete a waste, a waste drawer in communication with the chamber and configured to receive the waste, and one or more sensors configured to detect the one or more conditions of the automated litter device and transmit one or more signals related to the one or more conditions;

wherein the controller is configured to determine one or more positions of the chamber based on the one or more signals and interpret the one or more signals and one or more status signals; and wherein the communication module is configured to transmit the one or more status signals to the user interface.

14. The method of claim 13, wherein the one or more operations include: one or more cleaning cycles, one or more sleep modes, one or more wait modes, one or more light modes, one or more lockout modes, one or more training modes, one or more power modes, or a combination thereof.

15. The method of claim 14, wherein the user interface sends the one or more instructions to the communication module via an interaction interface; and wherein the interaction interface is an application programming interface (API).

16. A method of remotely monitoring signals, receiving signals, or both of an automated litter device via a communication module comprising the steps of:

a) detecting one or more conditions of the automated litter device by one or more sensors of the automated litter device and transmitting one or more signals related to the one or more conditions from the one or more sensors to a controller;

b) automatically determining the one or more conditions, one or more positions, or both of the automated litter device based on the one or more signals and forming one or more status signals with one or more processors of the controller;

c) transmitting the one or more status signals to the communication module of the automated litter device, wherein the communication module is a wireless communication module;

d) wirelessly transmitting the one or more status signals from the communication module via a network to a user interface, wherein the user interface is located remotely from the automated litter device; and wherein the automated litter device includes a chamber configured to hold litter to allow an animal to enter and excrete a waste, and a waste drawer in communication with the chamber and configured to receive the waste.

17. The method of claim 16, wherein the one or more sensors include one or more waste drawer sensors, one or more mass or presence sensors, one or more light sensors, one or more interlock sensors, one or more pinch detectors, one or more position sensors, one or more motor sensors, or any combination thereof.

18. The method of claim 17, wherein the one or more sensors include the one or more waste drawer sensors and the one or more conditions include a waste drawer fullness condition; and wherein the one or more processors of the controller, one or more processors remote from the automated litter device and in communication via the network, or both are adapted to interpret the waste drawer fullness condition as one or more waste drawer statuses which are relayed to the user interface via the communication module, the network, or both.

19. The method of claim 18, wherein the one or more processors of the controller, the one or more processors remote from the automated litter device, or both determine the one or more waste drawer statuses by applying a waste drawer algorithm configured to calculate how many cleaning cycles remain before the waste drawer is full;

wherein a cleaning cycle of the automated litter device is rotational movement of the chamber such that a waste opening of the chamber aligns with the waste drawer and the waste located within the chamber transfers from the chamber to the waste drawer; and wherein the waste drawer algorithm is stored within one or more non-transient storage mediums and accessible by the one or more processors of the controller, the one or more processors remote from the automated litter device, or both.

20. The method of claim 19, wherein the waste drawer algorithm calculates and averages how many of the cleaning cycles occurred between two or more waste drawer full signals, resets a clean cycle count and a waste drawer full signal, or both; and wherein the one or more waste drawer statuses include: how many of the cleaning cycles remain before the waste drawer is full, a percentage of fullness of the waste drawer, an estimated time duration until a user needs to empty the waste drawer, if subsequent cleaning cycles are prevented due to the waste drawer being full, or a combination thereof.

* * * * *